(12) United States Patent
Clark et al.

(10) Patent No.: US 9,360,581 B2
(45) Date of Patent: Jun. 7, 2016

(54) METHOD FOR CALIBRATING CURRENT AND MAGNETIC FIELDS ACROSS A DRILL COLLAR

(75) Inventors: Brian Clark, Sugar Land, TX (US); Mark E. Flaum, Houston, TX (US); Jan Morley, Houston, TX (US); Jaideva Goswami, Sugar Land, TX (US); Miguel F. Pabon, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 366 days.

(21) Appl. No.: 13/128,506

(22) PCT Filed: Nov. 17, 2009

(86) PCT No.: PCT/US2009/064780
§ 371 (c)(1),
(2), (4) Date: Aug. 22, 2011

(87) PCT Pub. No.: WO2010/059621
PCT Pub. Date: May 27, 2010

(65) Prior Publication Data
US 2011/0298462 A1    Dec. 8, 2011

Related U.S. Application Data

(60) Provisional application No. 61/116,355, filed on Nov. 20, 2008.

(51) Int. Cl.
*G01V 3/08*    (2006.01)
*G01V 3/26*    (2006.01)
*E21B 47/024*  (2006.01)

(52) U.S. Cl.
CPC ............... *G01V 3/26* (2013.01); *E21B 47/024* (2013.01)

(58) Field of Classification Search
CPC .................... G01V 3/26; E21B 47/024

USPC ................ 324/345, 346, 355–357, 338, 326; 175/45
See application file for complete search history.

(56) References Cited

U.S. PATENT DOCUMENTS 4,372,398 A * 2/1983 Kuckes ........................ 175/45
4,443,762 A * 4/1984 Kuckes ....................... 324/346

(Continued)

FOREIGN PATENT DOCUMENTS

EP    0653647 A2    5/1995
WO    9637678 A1    11/1996

OTHER PUBLICATIONS

Goswami, J. C. et al, Section 7.8, Two Channel Perfect Reconstruction Filter Bank, "Fundamentals of Wavelets", 2010, 2nd Edition, John Wiley & Sons, Hoboken, NJ, pp. 172-187.

(Continued)

*Primary Examiner* — Jay Patidar
(74) *Attorney, Agent, or Firm* — Kimberly Ballew

(57) ABSTRACT

A method for drilling a well includes applying a current across a drill collar that surrounds an internal magnetometer. The current travels across the drill collar and along one or more other current paths to return to the drill collar. The method also includes using the magnetometer to measure magnetic fields due to the current being applied across the drill collar and the current across one or more other current paths while the drill collar is disposed at a first angle of rotation and rotating the drill collar to a second angle of rotation. The method further includes measuring the magnetic fields using the internal magnetometer while the drill collar is disposed at the second angle of rotation and determining a relationship between the current across the drill collar and a portion of the magnetic fields due to the current across the drill collar measurable by the internal magnetometer.

10 Claims, 19 Drawing Sheets

(56) References Cited

U.S. PATENT DOCUMENTS

| | | | |
|---|---|---|---|
| 4,529,939 A * | 7/1985 | Kuckes | 324/346 |
| 4,593,770 A * | 6/1986 | Hoehn, Jr. | 175/45 |
| 4,700,142 A | 10/1987 | Kuckes | |
| 4,791,373 A * | 12/1988 | Kuckes | 324/346 |
| 4,933,640 A * | 6/1990 | Kuckes | 324/339 |
| 4,957,172 A * | 9/1990 | Patton et al. | 175/61 |
| 5,074,365 A * | 12/1991 | Kuckes | 175/40 |
| 5,084,678 A * | 1/1992 | Hutin | 324/346 |
| 5,258,755 A * | 11/1993 | Kuckes | 340/853.5 |
| 5,305,212 A * | 4/1994 | Kuckes | 702/7 |
| 5,343,152 A | 8/1994 | Kuckes | |
| 5,485,089 A * | 1/1996 | Kuckes | 324/346 |
| 5,512,830 A * | 4/1996 | Kuckes | 324/346 |
| 5,589,775 A * | 12/1996 | Kuckes | 324/346 |
| 5,676,212 A * | 10/1997 | Kuckes | 175/45 |
| 5,923,170 A * | 7/1999 | Kuckes | 324/326 |
| RE36,569 E * | 2/2000 | Kuckes | 324/346 |
| 7,475,741 B2 * | 1/2009 | Waters | 175/45 |
| 7,703,548 B2 | 4/2010 | Clark | |
| 7,812,610 B2 | 10/2010 | Clark et al. | |
| 7,962,287 B2 | 6/2011 | Clark | |
| 8,113,298 B2 * | 2/2012 | Kuckes | 175/45 |
| 8,307,915 B2 | 11/2012 | Clark et al. | |
| 8,462,012 B2 | 6/2013 | Clark et al. | |
| 8,810,247 B2 * | 8/2014 | Kuckes | 324/346 |
| 2009/0030615 A1 * | 1/2009 | Clark | 702/7 |
| 2011/0298462 A1 * | 12/2011 | Clark et al. | 324/346 |
| 2012/0067644 A1 * | 3/2012 | Goswami et al. | 175/45 |

OTHER PUBLICATIONS

International Search Report & Written Opinion issued in PCT/US2009/064780 on Jul. 6, 2010; 2 pages.

GCC Examination Report for GCC Application No. GCC/P/2009/14824 dated Jun. 5, 2013.

* cited by examiner

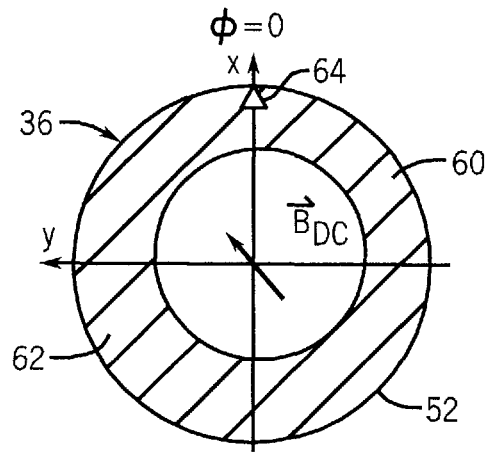
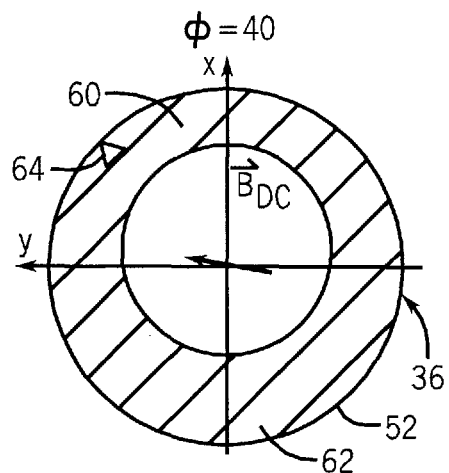
FIG. 8A        FIG. 8B
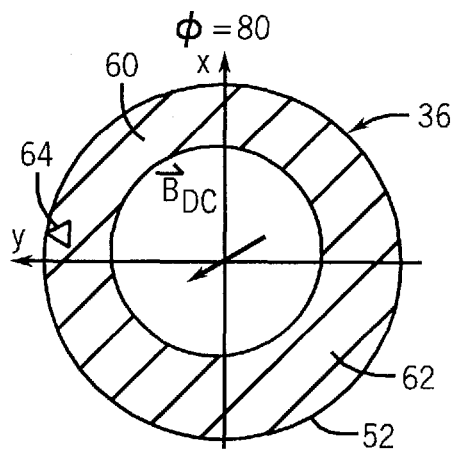
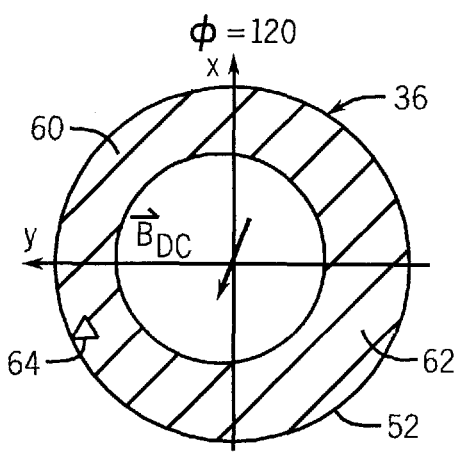
FIG. 8C        FIG. 8D
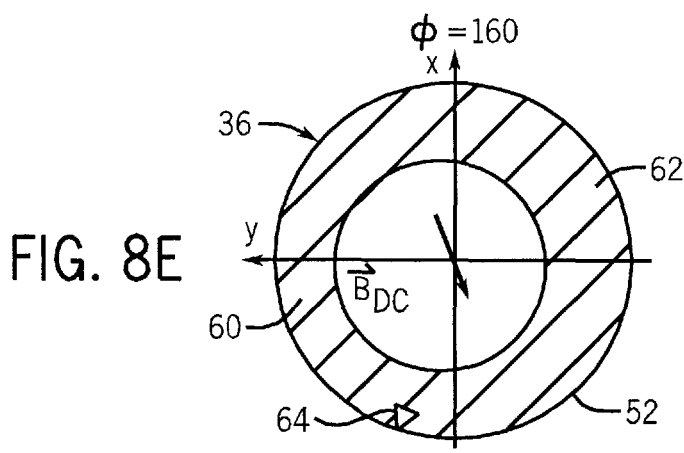
FIG. 8E

METHOD FOR CALIBRATING CURRENT AND MAGNETIC FIELDS ACROSS A DRILL COLLAR

This application claims the benefit of U.S. Provisional Application No. 61/116,355 filed Nov. 20, 2008.

BACKGROUND OF THE INVENTION

The present disclosure relates generally to well drilling operations involving magnetic ranging and, more particularly, to calibrating and correcting for noise that may arise during magnetic ranging.

To access certain hydrocarbons in the earth, two or more wells or boreholes may be drilled with a certain spatial relationship with respect to one another. Specifically, one borehole may be drilled such that it has a specific location relative to a previously drilled borehole. For example, heavy oil may be too viscous in its natural state to be produced from a conventional well, and, thus, an arrangement of cooperative wells and well features may be utilized to produce such oil. Indeed, to produce heavy oil, a variety of techniques may be employed, including, for example, Steam Assisted Gravity Drainage (SAGD), Cross Well Steam Assisted Gravity Drainage (X-SAGD), or Toe to Heel Air Injection (THAI). All such techniques may benefit by determining a borehole assembly (BHA) location relative to an existing well.

To drill a new well with a certain spatial relationship with respect to an existing cased well, techniques for magnetic ranging while drilling may be employed. To perform such techniques, a voltage difference may be applied across an insulated gap in a BHA used to drill the new well. In response to the voltage difference, a current may enter the surrounding formation and travel across the casing of the existing cased well, generating a magnetic field that may be measured by a magnetometer in the BHA. Based on the magnetic field measurements, the relative location of the existing cased well to the BHA may be determined. Noise in the measurement of the magnetic field, however, may impede this determination.

SUMMARY

Certain aspects commensurate in scope with the originally claimed embodiments are set forth below. It should be understood that these aspects are presented merely to provide the reader with a brief summary of certain forms the embodiments might take and that these aspects are not intended to limit the scope of the embodiments. Indeed, the embodiments may encompass a variety of aspects that may not be set forth below.

In one embodiment, a system may include a borehole assembly and data processing circuitry. The borehole assembly may include an electric current driving tool configured to cause a current to flow across a drill collar of the borehole assembly and an internal magnetometer disposed within the drill collar and between the insulated gap and an end of the borehole assembly, which may be configured to measure magnetic field signals that penetrate the drill collar. The data processing circuitry may be configured to remove all or part of a noise component of the magnetic field signals that arises due to an eccentricity in the drill collar.

In another embodiment, a method for calibrating a measurement sub housing an internal magnetometer may include applying a current across a drill collar that surrounds an internal magnetometer, such that the current travels across the drill collar and along one or more other current paths to return to the drill collar, measuring magnetic fields that result while the drill collar is disposed at a first angle of rotation, rotating the drill collar to a second angle of rotation, measuring the magnetic fields that result while the drill collar is disposed at the second angle of rotation, and determining a relationship between the current across the drill collar and a portion measurable to the internal magnetometer of the magnetic field due to the current across the drill collar.

BRIEF DESCRIPTION OF THE DRAWINGS

Advantages of the invention may become apparent upon reading the following detailed description and upon reference to the drawings in which:

FIGS. 8A-J are cross-sectional schematic views of an eccentric drill collar of a measurement sub at various angles of rotation, in accordance with an embodiment;

DETAILED DESCRIPTION OF SPECIFIC EMBODIMENTS

One or more specific embodiments of the present invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Additionally, as used herein, the terms "up" and "down," "upper" and "lower," and other like terms indicating relative positions to a given point or element are utilized to more clearly describe some elements of the embodiments of the invention. These terms generally relate to a reference point at the surface from which drilling operations are initiated as being the top point and the total depth of the well being the lowest point, whether or not the drilled well continues in a true downward direction.

Figure 1:
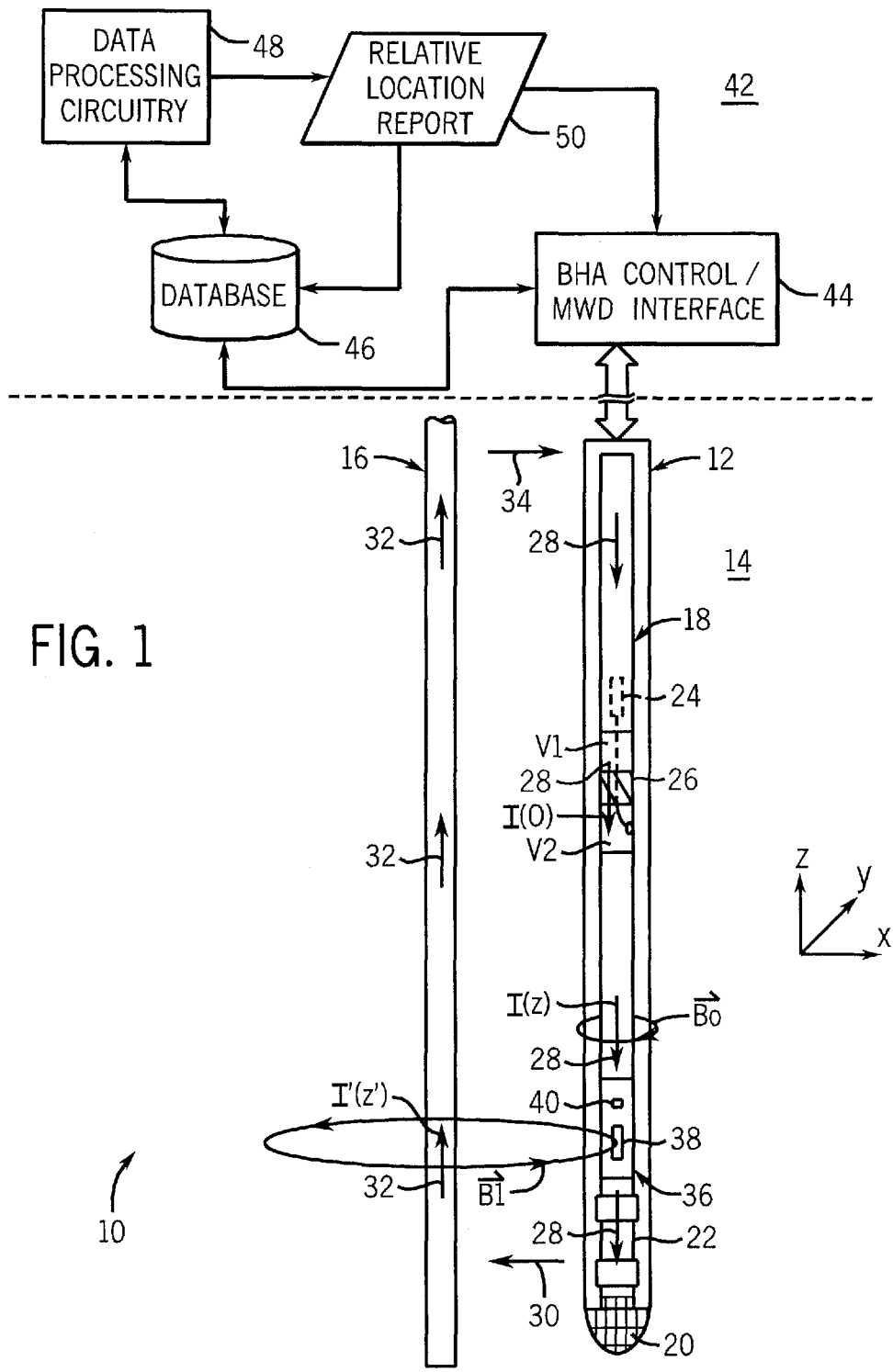
FIG. 1 illustrates a well-drilling system for drilling a new well proximate to an existing cased well using magnetic ranging while drilling in accordance with an embodiment.

FIG. 1 illustrates a well-drilling system 10 for drilling a new well proximate to an existing cased well using magnetic ranging while drilling techniques. A variety of applications may involve drilling a new well proximate to an existing cased well, including drilling a Steam Assisted Gravity Drainage (SAGD) well pair or drilling a new well in a field having one or more preexisting cased wells. Such applications may be described in patent applications to Schlumberger Technology Corporation such as U.S. patent application Ser. No. 11/550,839, "METHOD AND APPARATUS FOR LOCATING WELL CASINGS FROM AN ADJACENT WELLBORE," filed Oct. 19, 2006, or U.S. patent application Ser. No. 12/668,476, "ANTI-COLLISION METHOD FOR DRILLING WELLS," filed Jun. 24, 2008, which are incorporated by reference in their entirety. Thus, it should be understood that the techniques described herein may be employed to drill SAGD wells, Cross Well Steam Assisted Gravity Drainage (X-SAGD) wells, Toe to Heel Air Injection (THAI) wells, and/or to avoid collisions with existing wells while drilling in a field having existing wells, and so forth.

As illustrated in FIG. 1, a new well 12 may be drilled in a formation 14 having an existing cased well 16 cased with a conductive casing. To drill the new well 12, a borehole assembly (BHA) 18 may include, among other things, a drill bit 20 and a steerable system 22 to set the direction of the drill bit 20. The steerable system 22 may be a rotary steerable system, such as PowerDrive®, which may receive downlinked commands and drill ahead in a specified trajectory of direction and inclination. Alternatively, the steerable system 22 may be a mud motor with a bent sub; however, such an arrangement may be less efficient, as it may rely on manual orientations of the bent sub by a driller at the surface to control the direction and inclination of the drill bit 20.

The BHA 18 may include an electric current driving tool 24, which may be a component of a measurement while drilling (MWD) tool, such as Schlumberger's E-Pulse or E-Pulse Express tool, or which may be a standalone tool. The electric current driving tool 24 may apply a voltage difference $(v_1-v_2)$ across an insulated gap 26 in the drill collar of the BHA 18, causing an electric current 28 to flow across the drill collar of the BHA 18. It should be understood that the electric current driving tool 24 may be any tool capable of generating the current 28 on the drill collar of the BHA 18. The voltage difference applied by the electric current driving tool 24 may be an alternating (AC) voltage operating at a preferred frequency range of 0.1 to 20 Hz. Hereafter, an alternating current is assumed to have a sinusoidal time dependence of $\sin(\omega t)$ where t is time, $\omega=2\pi f$, and f is frequency in Hertz. Magnetic fields produced by the alternating frequency also have the same time dependence of $\sin(\omega t)$. The time dependence will be implicit in subsequent expressions. The earth's magnetic field is significantly larger than the magnetic fields generated by the AC current, but can be removed from the signal by a high pass filter since it is constant in time.

The electric current 28 on the BHA 18 may be denoted as I(z), where z is the distance along the BHA 18 and where z=0 corresponds to the insulated gap 26. The bottom of the drill may be denoted as located at z=L. The electric current 28 that is injected across the insulated gap, I(0), can be measured locally and the amplitude of which may be transmitted to the surface by a MWD telemetry system, which may include the electric current driving tool 24 or which may be a separate MWD telemetry system.

When the electric current driving tool 24 causes the electric current 28 to flow across the drill collar of the BHA 18, part of the electric current 28 may also flow into the formation as an outflow formation current 30. Similarly, part of the outflow formation current 30 may travel across the existing cased well 16 as a casing current 32, as the casing on the existing cased well 16 may provide a path of low resistance. The casing current 32 may return to the BHA 18 as inflow formation current 34. The casing current 32 may be denoted as I'(z'), where z' is the distance along the existing cased well 16. Though the casing current 32 may vary along the casing of the existing cased well 16, it may produce an azimuthal magnetic field $\vec{B}_1$ centered on the existing cased well 16.

A measurement sub 36 in the BHA 18 may measure the magnetic field using an internal, three-axis magnetometer 38. By measuring the three orthogonal components of the magnetic field $\vec{B}_1$, and with knowledge of the current I(0), it may be possible to determine the distance and direction from the internal magnetometer to the existing cased well 16. Specifically, the casing current 32 on the casing of the existing cased well 16, I'(z'), may be considerably smaller than the current 28 on the BHA 18, I(z), as much of the outflow formation current 30 may simply flow through the formation 14 to return to the BHA 18. The farther the existing cased well 16 is from the BHA 18, the less casing current 32 will concentrate on the casing and, correspondingly, the weaker the magnetic field $\vec{B}_1$ will be. As should be appreciated, the magnetic field $\vec{B}_1$ is proportional to I'(z') and inversely proportional to the radial distance between the existing cased well 16 and the measurement sub 36 of the BHA 18.

In addition to the magnetic field $\vec{B}_1$, which is due to the current I'(z') on the casing of the existing cased well 16, a much stronger magnetic field $\vec{B}_0$ may be located outside the drill collars due the current I(z). The magnetic field $\vec{B}_0$ may be oriented azimuthally about the BHA 18, and its magnitude may be given by the equation, $$B_0(\rho) = \frac{\mu_0 I(z)}{2\pi\rho},$$

where $\mu_0 = 4\pi \cdot 10^{-7}$ Henry/m and where $\rho$ is the radial distance in meters from the axis of the BHA 18. In a perfectly symmetric measurement sub 36, the magnetic field $\vec{B}_0$ would not penetrate inside the drill collar of the measurement sub 36. Under such conditions, the internal three-axis magnetometer 38 of the measurement sub 36 would not detect the magnetic field $\vec{B}_0$, even though it may detect the weaker magnetic field $\vec{B}_1$ arising from the current I'(z') on the existing cased well 16.

When present in the measurement sub 36, one or more external magnetometers 40 may serve several purposes, three of which are explained in U.S. patent application Ser. No. 11/781,704, "METHOD FOR OPTIMIZING MAGNETIC SIGNALS AND DETECTING CASING," filed Jul. 23, 2007, and assigned to Schlumberger Technology Corporation, which is incorporated by reference in its entirety. The one or more external magnetometers 40 can measure the external magnetic field $\vec{B}_0$ due to the current I(z) on the BHA 18, and hence determine the current I(z) via the above equation. The current I(z) can then be used to provide a reference signal for lock-in detection for the internal three-axis magnetometer 38. The one or more external magnetometers 40 can also be used to estimate the resistivity of the formation 14, and can be used to improve the estimate of the casing current 32 on the casing of the existing cased well 16. A fourth use for the one or more external magnetometers 40 will be described further below.

Measurements of the magnetic fields $\vec{B}_0$ and/or $\vec{B}_1$ may be transmitted from the measurement sub 36 to the surface 42 for processing. Specifically, the BHA 18 may communicate with a BHA control/MWD interface 44 using E-Pulse-based electric pulse telemetry, mud pulse telemetry, or any other telemetry system communication downlink. The BHA control/MWD interface 44 may represent a stand-alone, special-purpose module associated with an MWD system of the BHA 18, or may represent an input device for a general processor-based system that may be employed for processing the measurements in accordance with the present techniques. A database 46 and data processing circuitry 48 may also represent components of such a general processor-based system. Such a processor-based system may be a general-purpose computer, such as a personal computer, configured to run a variety of software, including software implementing all or part of the present technique. Alternatively, the processor-based system may include, among other things, a mainframe computer, a distributed computing system, or an application-specific computer or workstation configured to implement all or part of the present technique based on specialized software and/or hardware provided as part of the system. Further, the processor-based system may include either a single processor or a plurality of processors to facilitate implementation of the presently disclosed functionality.

In general, the processor-based system that may encompass all or part of the BHA control/MWD interface 44, database 46, and/or data processing circuitry 48 may include a microcontroller or microprocessor, such as a central processing unit (CPU), which may execute various routines and processing functions. For example, the microprocessor may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the microprocessor may process data provided as inputs for various routines or software programs, such as data provided as part of the present techniques in computer-based implementations.

Such data associated with the present techniques may be stored in, or provided by, the memory or mass storage device of the processor-based system that may encompass all or part of the BHA control/MWD interface 44, database 46, and/or data processing circuitry 48. Alternatively, such data may be provided to the microprocessor of the processor-based system via one or more input devices. In one embodiment, the BHA control/MWD interface 44 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the processor-based system may exchange data and communicate with other networked electronic systems, whether proximate to or remote from the system. The network may include various components that facilitate communication, including switches, routers, servers or other computers, network adapters, communications cables, and so forth.

Processing in accordance with techniques of the present disclosure may begin when the measurements of the magnetic fields $\vec{B}_0$ and/or $\vec{B}_1$, obtained by the magnetometers 38 and 40, respectively, are received at the surface 42 by the BHA control/MWD interface 44. After receiving the measurements of the magnetic field $\vec{B}_0$ and/or $\vec{B}_1$, the BHA control/MWD interface 44 may store the measurements in the database 46, which may be accessible to the data processing circuitry 48. In accordance with one or more stored routines, the data processing circuitry 48 may employ the measurements of the magnetic field $\vec{B}_0$ and/or $\vec{B}_1$ to ascertain the relative location of the measurement sub 36 of the BHA 18 to the existing cased well 16. The data processing circuitry 48 may thereafter output a relative location report 50, which may be stored in the database 46 or transmitted to the BHA control/MWD interface 44. The relative location report 50 may indicate the location of the measurement sub 36 of the BHA 18 to the existing cased well 16 in the (x, y, z) coordinate system, as indicated in FIG. 1. Additionally or alternatively, the relative location report 50 may be provided to an operator via one or more output devices, such as an electronic display and/or a printer.

As noted above, the BHA control/MWD interface 44 may communicate with the BHA 18 using E-Pulse-based electric pulse telemetry, mud pulse telemetry, or any other telemetry system communication downlink. Through the communication downlink, the BHA control/MWD interface 44 may control the BHA 18, as well as receive data obtained by the measurement sub 36. In the presently illustrated embodiment, the BHA control/MWD interface 44 may automatically steer the drill bit 20 based on the relative location report 50. Additionally or alternatively, an operator in control of the BHA control/MWD interface 44 may steer the drill bit 20 based on the printed or electronically displayed relative location report 50.

Figure 2:
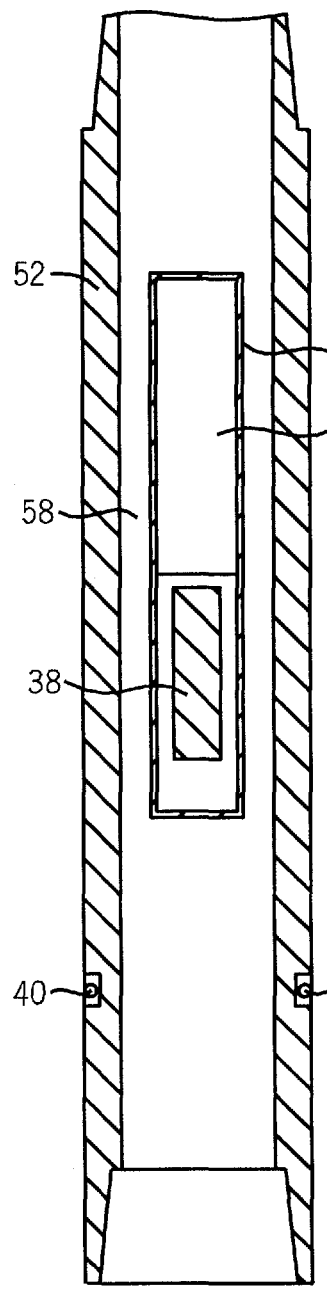
FIG. 2 is a transverse cross-sectional schematic view of a measurement sub for calibration in accordance with an embodiment.
Figure 3:
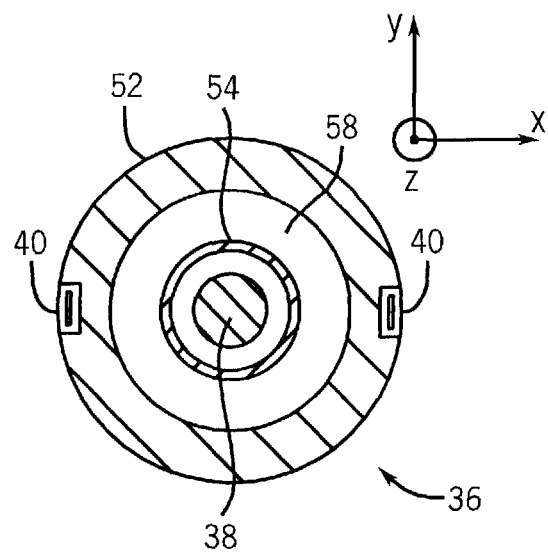
FIG. 3 is an axial cross-sectional schematic view of a measurement sub for calibration in accordance with an embodiment.

FIGS. 2 and 3 are schematic cross-sectional views of the measurement sub 36 of the BHA 18. Specifically, FIG. 2 illustrates an axial cross-sectional view of the measurement sub 36 and FIG. 3 illustrates a transverse cross-sectional view of the measurement sub 36. As shown in FIGS. 2 and 3, the measurement sub 36 may include a cylindrical drill collar 52 having measurement tools in a pressure housing 54. The pressure housing 54 may contain the three-axis magnetometer 38 as well as various power & control electronics 56, which may include a processor, memory, power supply, and so forth. Though not expressly illustrated in the schematic views of FIGS. 2 and 3, the measurement sub 36 may additionally include communication circuitry for communication with the surface 42 via another MWD tool in the BHA 18, as well as a three-axis inclinometer. Measurements from the three-axis inclinometer may enable determination of the borehole orientation and rotational angle of the measurement sub 36 with respect to down, known quantitatively as the gravity tool face (GTF). Alternatively, the borehole direction, the borehole inclination, and the gravity tool face may be determined using a different sub of the BHA 18. Measurements from the three-axis magnetometer 38 in the measurement sub 36 may be used to determine the borehole direction with respect to magnetic North and/or the rotational angle of the measurement sub 36 with respect to magnetic North, known as the magnetic tool face (MTF).

Figure 4:
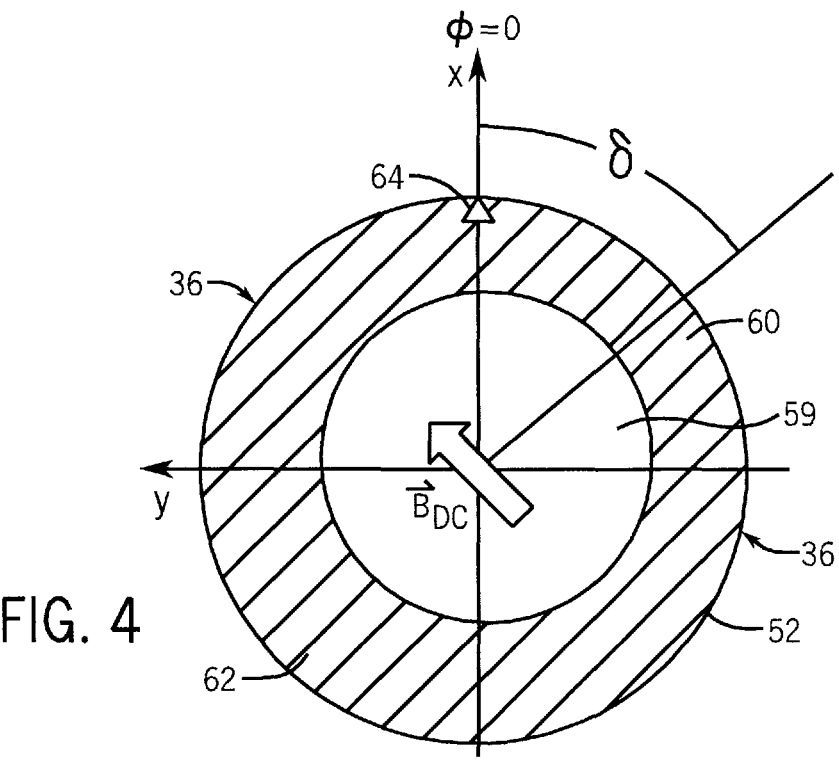
FIG. 4 is a cross-sectional schematic view of an eccentric drill collar of the measurement sub at the location of an internal three-axis magnetometer, in accordance with an embodiment.

As particularly apparent in FIG. 3, the pressure housing 54 and the drill collar 52 of the measurement sub 36 are ideally substantially symmetrical. An annular space 58 between the pressure housing 54 and the drill collar 52 may permit drilling mud to flow through the measurement sub 36 to other components of the BHA 18. When the drill collar 52 of the measurement sub 36 is symmetrical, the azimuthal magnetic field $\vec{B}_0$ caused by the electric current I(z) will not penetrate the drill collar 52. As illustrated in FIG. 4, however, the drill collar 52 of the measurement sub 36 may not be completely symmetrical. FIG. 4 illustrates a schematic cross-sectional view of the drill collar 52 of the measurement sub 36 at the location of the internal three-axis magnetometer 38 when the drill collar 52 is formed by a circular, eccentric bore 59. As a result, the drill collar 52 may include a thin wall 60 and a thick wall 62. Other "drill collar asymmetries" in the drill collar 52 may arise, for example, based on non-uniform conductivity over a cross-section of the drill collar, a non-round bore 59, or a non-round collar outer diameter.

When the drill collar 52 is not completely symmetrical, a small magnetic field $\vec{B}_{DC}$ due to the current I(z) may be detectable within the drill collar 52. Because the magnetic field $\vec{B}_{DC}$ is proportional to the current on the drill collar 52, I(z), the signal of the measured magnetic field $\vec{B}_{DC}$ is coherent with that of the magnetic field $\vec{B}_1$ arising from the current I'(z') on the existing cased well 16, as the magnetic field $\vec{B}_{DC}$ has the same frequency and phase as the magnetic field $\vec{B}_1$. Hence, it cannot be removed in the same manner as incoherent noise by simply averaging over time.

The drill collar 52 of the measurement sub 36 may have a scribe line 64 or other indicator that references its rotational orientation with respect to gravity tool face (GTF) or magnetic tool face (MTF). Gravity tool face (GTF) is the angle ϕ between the scribe line 64 and up. In FIG. 4, the scribe line 64 is located at a gravity tool face (GTF) of ϕ=0°.

The magnetic field $\vec{B}_{DC}$ is related to the asymmetry of the measurement sub 36 and proportional to the current I(z) on the drill collar 52 of the measurement sub 36 as indicated by the following equation:

$$B_{DC} = K \cdot I(z) \qquad (1),$$

where K is a calibration constant primarily related to the geometry of the measurement sub 36. Both K and δ are independent of temperature, pressure, and other downhole environmental effects. Once they are determined by calibration measurements, they can be used to correct the measurements of the internal three-axis magnetometer 38.

Figure 5:
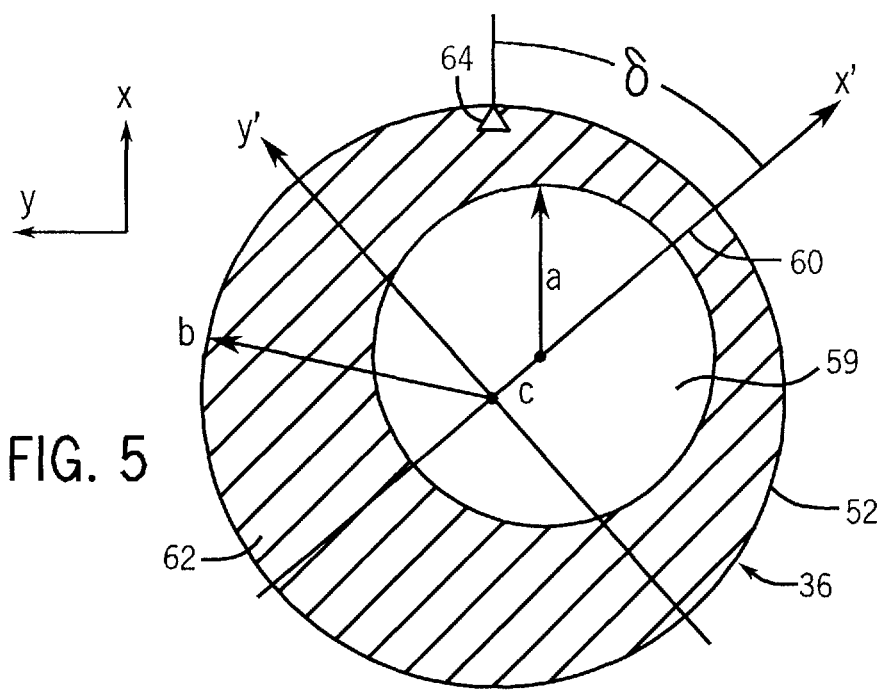
FIG. 5 is another cross-sectional schematic view of the eccentric drill collar of the measurement sub at the location of the internal three-axis magnetometer, in accordance with an embodiment.

Consider, for example, the exaggerated asymmetry of the drill collar 52 of the measurement sub 36 shown in FIG. 5, which illustrates a cross-sectional view of the drill collar 52 of the measurement sub 36 in an alternative coordinate system (x',y'). In the alternative coordinate system (x',y') the x' axis is chosen to intersect the thinnest and thickest portions of the drill collar wall, forming an angle δ with respect to the scribe line 64. The inner diameter of the bore 59 of the drill collar 52 is $2a$, the outer diameter of the drill collar 52 is $2b$, and the bore 59 is eccentric by an amount c. The bore 59 and drill collar 52 outer diameter are otherwise perfect circles. The unit vectors for the x' and y' axes are $\hat{x}'$ and $\hat{y}'$. The magnetic field inside the bore may be given by the following equation:

$$\vec{B}(x', y') = B_{DC}\hat{y}', \text{ where } B_{DC} = \frac{\mu_0 c I(z)}{2\pi(b^2 - a^2)}. \qquad (2)$$

The magnetic field inside the bore 59 is constant in amplitude and direction and aligned with the direction normal to that of the eccentricity. For the example of FIG. 5, the calibration constant relating the internal field to the collar current may be given by the following equation:

$$K = \frac{\mu_0 c}{2\pi(b^2 - a^2)}. \qquad (3)$$

For a specific example, consider that the drill collar 52 is 7-inches in diameter (b=8.89 cm) with a bore 59 having a diameter of 4-inches (a=5.08 cm), with 0.005 inches of eccentricity (c=0.127 mm) For I(z)=1 amp on the drill collar 52, the magnetic field $\vec{B}_0$ at the surface of the drill collar 52 is $B_0$=2, 250 nTesla, while the magnetic field $\vec{B}_{DC}$ inside the bore 59 is $B_{DC}$=4.8 nTesla. The ratio of these magnetic fields is $B_{DC}/B_0 = 2.1 \cdot 10^{-3}$, or −53 dB. A more important ratio is the internal magnetic field $\vec{B}_{DC}$ to the magnetic field $\vec{B}_1$ arising from the current I'(z') on the existing cased well 16. For a typical measurement sub 36 configuration, the magnetic field $\vec{B}_1$ arising when the existing cased well 16 is 5 m distant may be measured as approximately 10 to 20 nTesla. Thus, the magnetic field $\vec{B}_{DC}$ inside the drill collar 52 of the measurement sub 36 may be similar in magnitude to the magnetic field $\vec{B}_1$ arising from the current I'(z') on the existing cased well 16 as measured by realistic measurement subs 36.

Since the internal magnetic field $\vec{B}_{DC}$ is synchronous with the magnetic field $\vec{B}_1$, the present disclosure describes various solutions for reducing or eliminating the internal magnetic field $\vec{B}_{DC}$ from the signals measured by the magnetometer 38 of the measurement sub 36. By synchronous, it is meant that $\vec{B}_{DC}$ and $\vec{B}_1$ both have the same time dependence sin ωt. Such solutions may involve various devices and techniques for calibrating the measurement sub 36 (e.g., obtaining K and δ) and/or for performing data acquisition procedures to reduce or eliminate effects of the internal magnetic field $\vec{B}_{DC}$.

Figure 6:
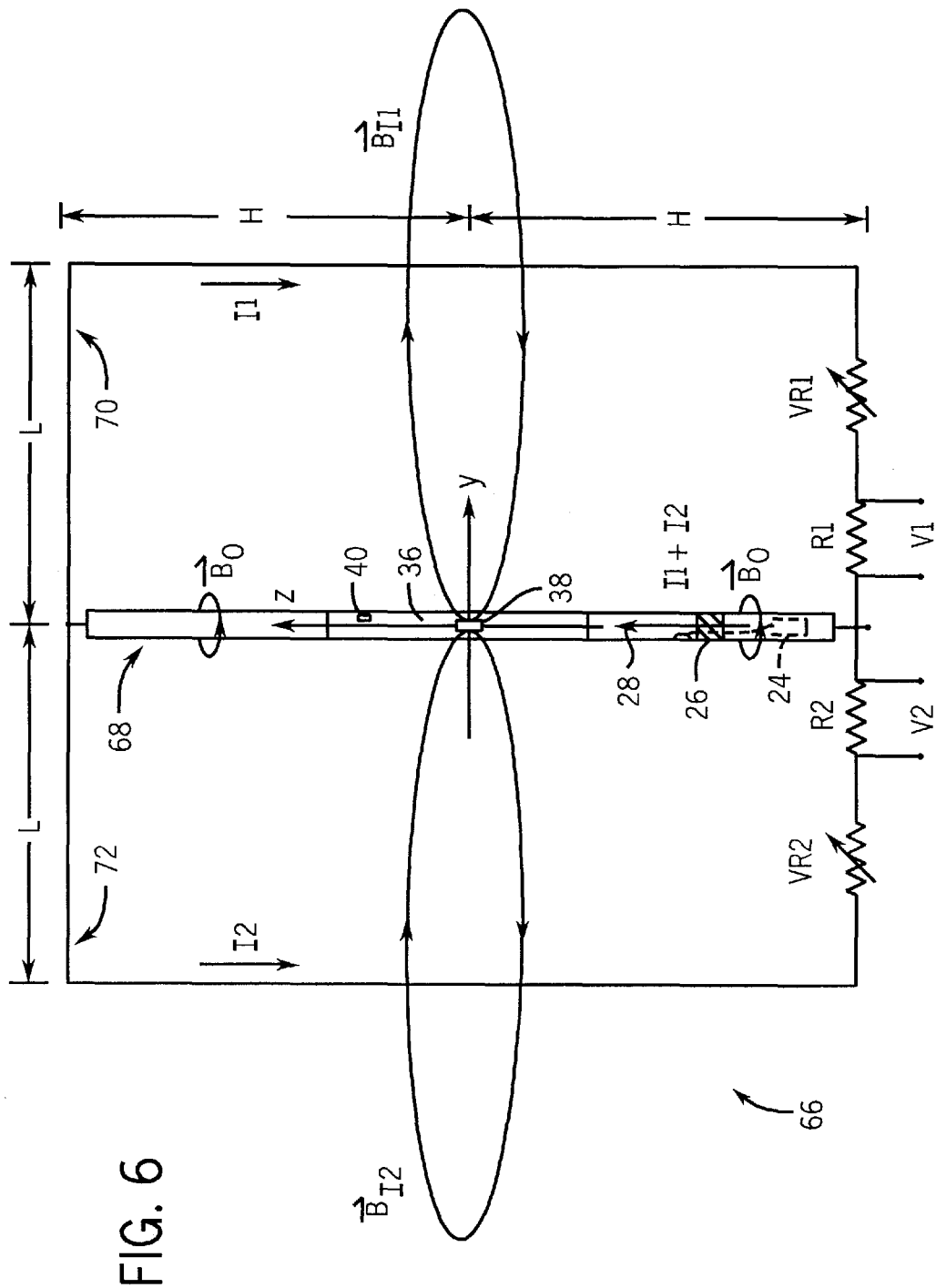
FIG. 6 illustrates a calibration system for calibrating a measurement sub with an eccentric drill collar in accordance with an embodiment.

FIG. 6 illustrates an embodiment of a calibration system 66 for calibrating the measurement sub 36 and for obtaining K and δ. The calibration system 66 may be employed after manufacturing the measurement sub 36 or in a pre-job calibration performed in a field shop. There should be no magnetic materials or highly conductive materials in the area surrounding the calibration system 66. In the embodiment illustrated in FIG. 6, the calibration system 66 includes a series of drill collars 68 having a similar configuration to the BHA 18, and may include the electric current driving tool 24, the insulated gap 26, and the measurement sub 36 containing the internal three-axis magnetometer 38. Additionally, the measurement sub 36 may include the one or more external magnetometers 40. The current 28 across the insulated gap 26 can be powered by downhole electronics or by a laboratory oscillator.

Two wire loops 70 and 72 of width L and height 2H may lie in the plane of the measurement sub 36. In general, the two wire loops 70 and 72 may be identical in size and shape, and may be placed symmetrically with respect to the drill collar 68. The two symmetric wire loops 70 and 72 may contain precision, matched resistors R1 and R2, respectively, and variable resistors VR1 and VR2, respectively. The respective voltages V1 and V2 across the precision resistors R1 and R2 may be used to measure the currents $I_1$ and $I_2$ that flow in the two loops 70 and 72, and the variable resistors VR1 and VR2 may be used to control the two currents $I_1$ and $I_2$. The variable resistors VR1 and VR2 can be used to null the sum of magnetic fields $\vec{B}_{l1}$ and $\vec{B}_{l2}$ due to the two wire loops 70 and 72 at the location of the measurement sub 36. The sum of the two currents, $I_1+I_2$, flows on the drill collars 68, and results in a strong local azimuthal magnetic field $\vec{B}_0$ centered on the drill collars.

As illustrated in FIG. 6, the internal three-axis magnetometer 38 of the measurement sub 36 is located at the center, i.e. at (0,0,0), where the x and y directions are in the earth frame and perpendicular to the axis of the drill collar 68. For convenience, the x direction may be understood as vertically up, and the y and z directions may be understood as horizontal, with the z direction aligned with the drill collars 68 axis. This is a geostationary coordinate system which refers to the (x,y, z) coordinates being referenced to the earth frame. The three-axis magnetometer 38 will have one sensor along the z direction, but the two transverse magnetometer sensors will not be aligned with the x and y axes in general. However, it is possible to compute the magnetic field in the geostationary frame from the two transverse magnetometer sensors. If the measurement sub 36 is perfectly symmetric, then the portion of the magnetic field measurable by the three-axis magnetometer 38 of the measurement sub 36 that is due to the current 28 on the drill collars 68 will be zero (e.g., $B_{DC}$=0 or, equivalently, K=0). Under such conditions, the magnetic field inside measurable by the three-axis magnetometer 38 of the measurement sub 36 would be due only to the magnetic fields $\vec{B}_{l1}$ and $\vec{B}_{l2}$, the sums of which may be expressed by the relationship $\vec{B}_L(0,0,0)=\vec{B}_L=B_{Lx}\hat{x}+B_{Ly}\hat{y}$.

Figure 7:
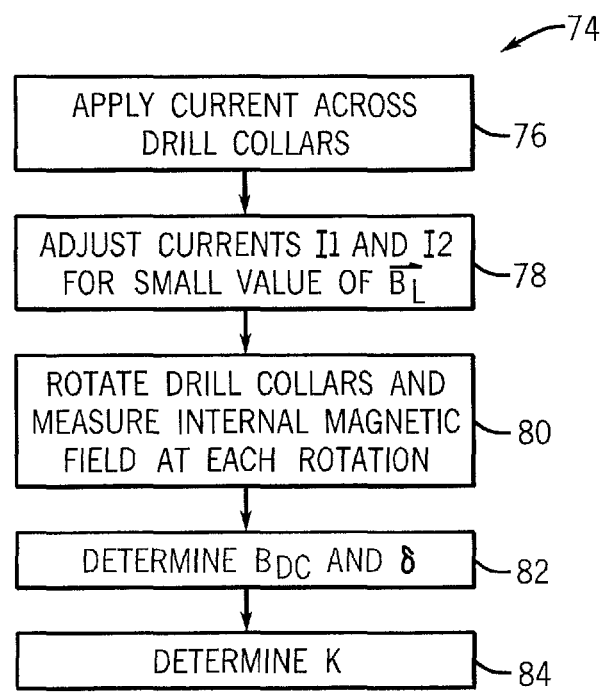
FIG. 7 is a flowchart describing a method for calibrating a measurement sub using the calibration system of FIG. 6, in accordance with an embodiment.
Figure 8F:
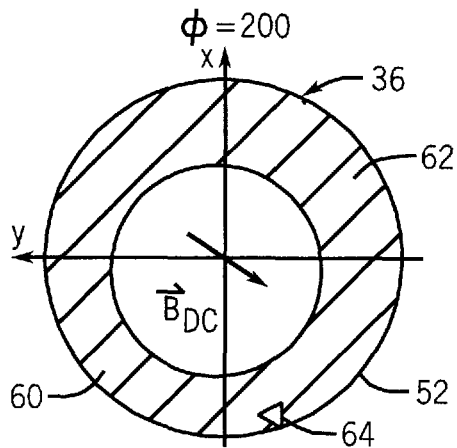
Figure 8G:
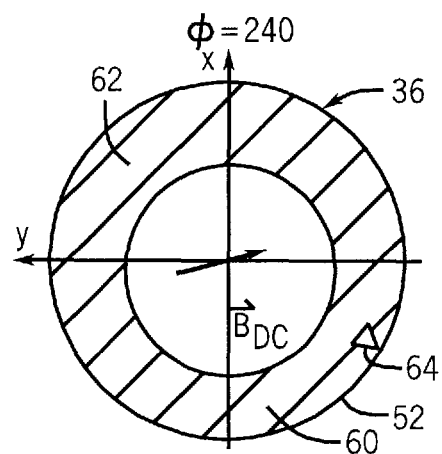
Figure 8H:
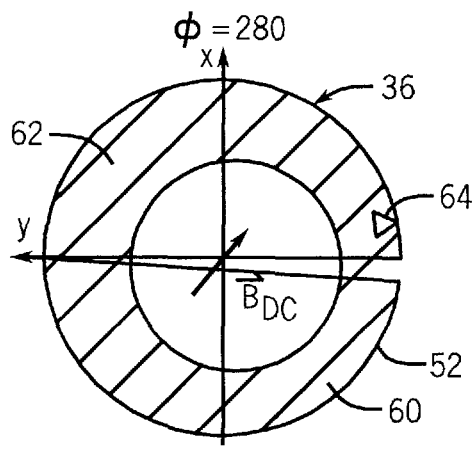
Figure 8I:
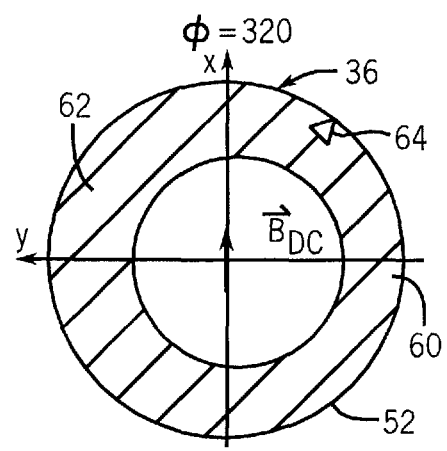
Figure 8J:
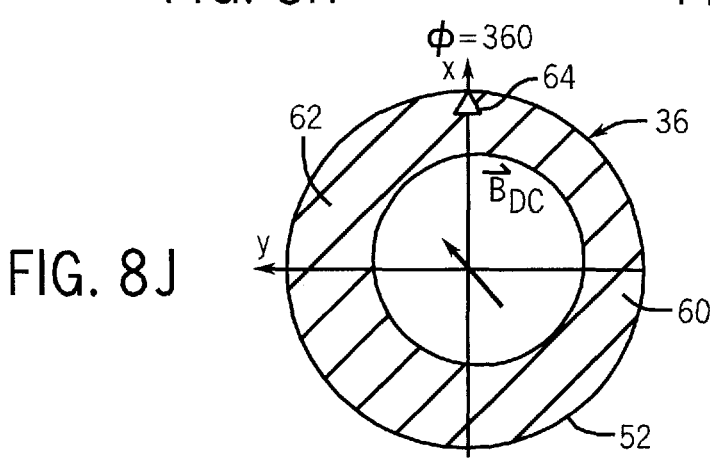

To calibrate the measurement sub 36 when the measurement sub 36 is not completely symmetric, a flowchart 74 is illustrated in FIG. 7. The flowchart 74 may begin with a first step 76, in which current may be applied across the drill collars 68 using either downhole electronics or a laboratory oscillator. If the two rectangular wire loops 70 and 72 are symmetric, then the magnetic fields measurable by the three-axis magnetometer 38 located at (0,0,0) may be given by the following equation:

$$\vec{B_L} = -\frac{\mu_0(I2-I1)}{4\pi L}\hat{x}\left\{\sqrt{1+(L/H)^2}+\sqrt{1+(L/H)^2}\right\}. \quad (4)$$

In a next step 78, by adjusting the two currents $I_1$ and $I_2$, a relatively small value for $\vec{B}_L$ can be obtained, thus allowing for an accurate measurement of K and δ.

In step 80, the drill collars 68 may be rotated in steps of predetermined angles from φ=0° to φ=360°, as generally shown in FIGS. 8A-J, which illustrate cross-sectional views of the measurement sub 36 in the drill collars 68 shown in FIG. 6. In FIGS. 8A-J, $\vec{B}(\phi)$ represents the magnetic field measurable by the interior three-axis magnetometer 38 of the measurement sub 36, where φ is the angle between the scribe mark 64 and up (i.e., the +x direction) of the measurement sub 36. Also, $\vec{B}_L$ may be assumed to be relatively small after balancing the magnetic fields $\vec{B}_{l1}$ and $\vec{B}_{l2}$ of the two loops 70 and 72 in step 78.

Continuing with step 80 of the flowchart 74 of FIG. 7, at each position of rotation of the drill collars 68, the magnetic field $\vec{B}(\phi)$ may be measured by the internal three-axis magnetometer 38 of the measurement sub 36. Note that $\vec{B}(\phi)$ is the magnetic field expressed in the earth frame (e.g., in x-y coordinates). If the direction of $\vec{B}(\phi)$ rotates with the measurement sub 36, then it is due to the asymmetry of the drill collar 52 of the measurement sub 36. However, if the direction of $\vec{B}(\phi)$ does not change with rotation, then it is most likely due to the magnetic field $\vec{B}_L$ arising due to unbalanced wire loops 70 and 72.

In general, $\vec{B}(\phi)$ may include a combination of both $\vec{B}_{DC}$ and $\vec{B}_L$, so that the magnetic field inside the drill collar can be written as follows:

$$\vec{B}(\phi)=B_x(\phi)\hat{x}+B_y(\phi)\hat{y} \quad \text{(5a), where}$$

$$B_x(\phi)=B_{DC}\sin(\delta-\phi)+B_{Lx} \quad \text{(5b), and}$$

$$B_y(\phi)=B_{DC}\cos(\delta-\phi)+B_{Ly} \quad \text{(5c).}$$

In step 82, after acquiring measurements of the magnetic fields $B_x(\phi)$ and $B_y(\phi)$ at several angles over 360° of rotation of the measurement sub 36, such data can be processed in data processing circuitry, such as the data processing circuitry 48, to determine $B_{DC}$ and δ. Specifically, using Equations (5b) and (5c), the data may be inverted, as illustrated by the following example. Consider the case when measurements are obtained at the following angles: $\{\phi_i, i=1, 2, 3, \ldots, n\}$. The set of measured quantities may be designated as $\{\widetilde{B}_x(\phi_i), \widetilde{B}_y(\phi_i)\}$. Note that the angles do not have to have a uniform spacing, but there should be enough samples to fit the data to sine and cosine functions. The following two quantities may be minimized with respect to $B_{DC}$, $\delta$, $B_{Lx}$, and $B_{Ly}$:

$$\chi_x^2 = \sum_{i=1}^{n} \{\widetilde{B}_x(\phi_i) - B_{DC}\sin(\delta - \phi_i) - B_{Lx}\}^2, \text{ and} \quad (6a)$$

$$\chi_y^2 = \sum_{i=1}^{n} \{\widetilde{B}_y(\phi_i) - B_{DC}\cos(\delta - \phi_i) - B_{Ly}\}^2. \quad (6b)$$

The results provide measured values for $\widetilde{B_{DC}}$, $\widetilde{\delta}$, $\widetilde{B_{Lx}}$, and $\widetilde{B_{Ly}}$, where the tilde indicates the output of the minimization procedure. In step 84, the data processing circuitry may determine the calibration constant K from $K = \widetilde{B_{DC}}/(\widetilde{I}_1 + \widetilde{I}_2)$, where $\widetilde{I}_1$ and $\widetilde{I}_2$ are measured using the precision resistors R1 and R2. The calibration angle is $\widetilde{\delta}$, as determined in step 82, which relates the direction of eccentricity to the scribe mark.

Figure 9A:
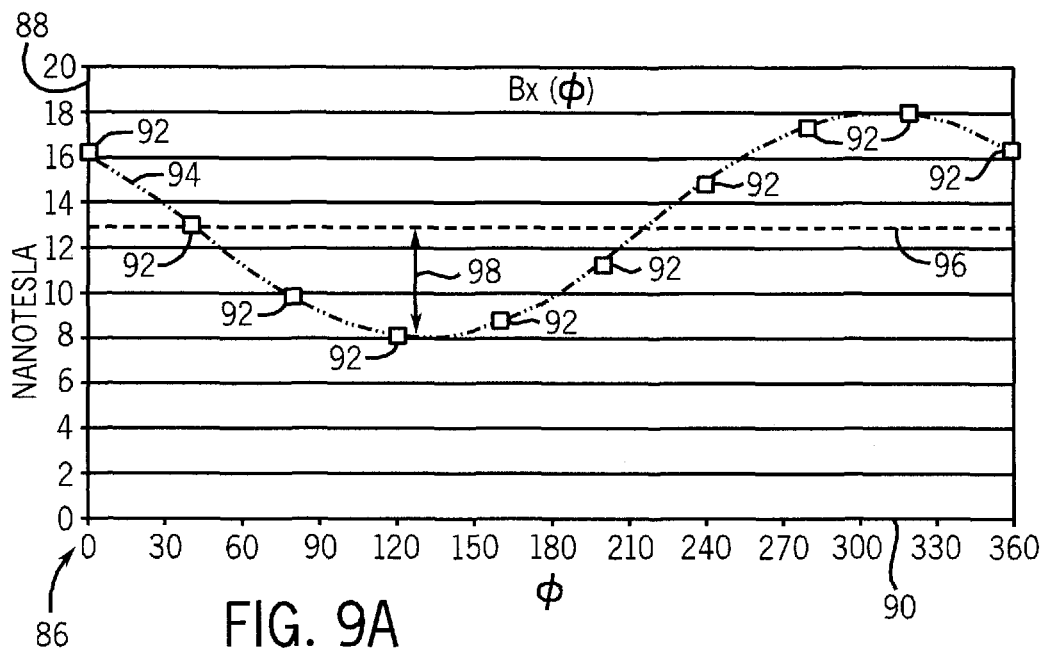
FIGS. 9A-B are plots of simulated magnetic field measurements taken at the various angles of rotation of FIGS. 8A-J.
Figure 9B:
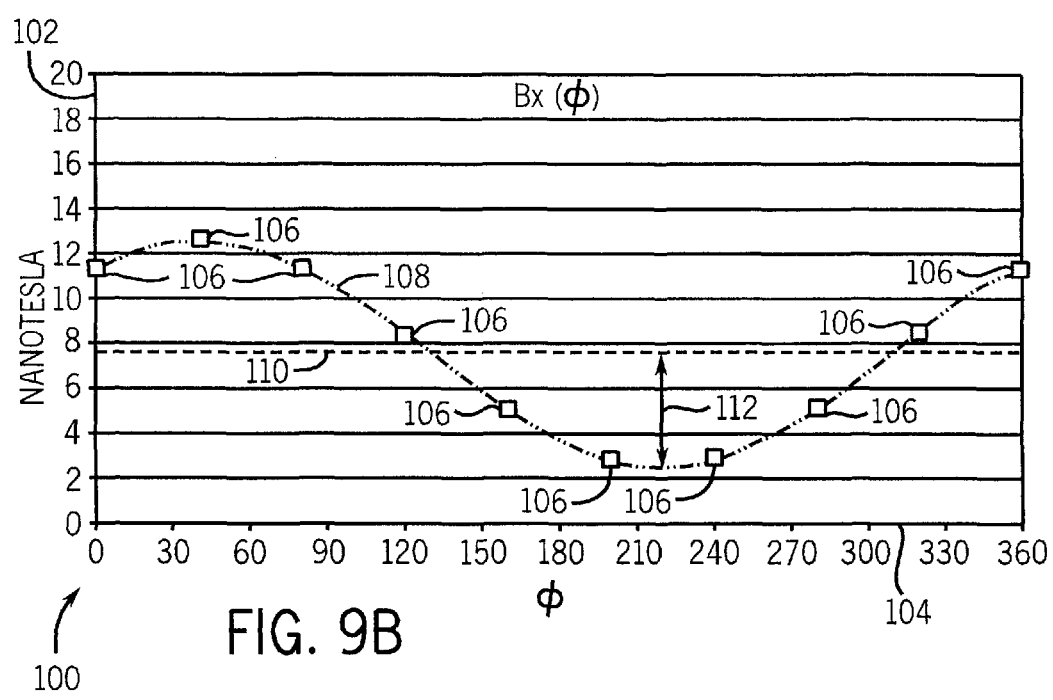

FIGS. 9A-B illustrate how measured magnetic field $\vec{B}(\phi)$ data may be employed in conjunction with Equations (5a)-(5c). In FIGS. 9A and B, the following quantities are simulated: $B_{DC}=5$ nTesla, $\delta=40°$, $B_{Lx}=13$ nTesla, and $B_{Ly}=7.5$ nTesla. Note that $B_x(\phi)$ and $B_y(\phi)$ have a relative phase shift of 90°. Turning first to plot 86 of FIG. 9A, an ordinate 88 represents $B_x(\phi)$ magnetic field strength in units of nTesla and an abscissa 90 represents rotation angle $\phi$ relative to the gravity tool face (GTF) in units of degrees. Individual $B_x(\phi)$ data points 92 may fit a curve 94. Because the curve 94 represents the value $B_x(\phi) = B_{DC}\sin(\delta - \phi) + B_{Lx}$, the static component 96 of the curve 94 represents the magnetic field $B_{Lx}$, while the amplitude 98 of the curve 94 may be used to determine the magnetic field $B_{DC}$.

Turning next to plot 100 of FIG. 9B, an ordinate 102 represents $B_y(\phi)$ magnetic field strength in units of nTesla and an abscissa 104 represents rotation angle $\phi$ relative to the gravity tool face (GTF) in units of degrees. Individual $B_y(\phi)$ data points 106 may fit a curve 108. Because the curve 108 represents the value $B_y(\phi) = B_{DC}\cos(\delta - \phi) + B_{Ly}$, the static component 110 of the curve 108 represents the magnetic field $B_{Ly}$, while the amplitude 112 of the curve 108 may be used to determine the magnetic field $B_{DC}$.

Additionally or alternatively, the calibration system 66 of FIG. 6 may employ the one or more external magnetometers 40 on the measurement sub 36 for determining the current 28 on the drill collar 52 of the measurement sub 36. Specifically, the current may be determined according to the following equation:

$$\widetilde{I} = \widetilde{I}_1 + \widetilde{I}_2 = \frac{\mu_0}{2\pi b \widetilde{B}_0}, \quad (7)$$

where b represents the outer diameter of the drill collar 52 of the measurement sub 36, and where $\widetilde{B}_0$ is measured with the one or more external magnetometers 40. Alternatively, if $\widetilde{I}_1$ and $\widetilde{I}_2$ have been determined using the precision resistors R1 and R2, the calibration system 66 can be used to calibrate the one or more external magnetometers 40. That is, the calibration system 66 may relate the current 28 on the drill collar 52 of the measurement sub 36, which is equal to $\widetilde{I}_1 + \widetilde{I}_2$, to the magnetic field $\widetilde{B}_0$ measured by the one or more external magnetometers 40.

The specifics of the examples above are not meant to be limitative but rather to be explanatory. Indeed, the calibration system 66 of FIG. 6 may have a variety of configurations. For example, the wire loops 70 and 72 need not be rectangular, and could take any of a variety of shapes. Even a single wire loop may suffice in place of wire loops 70 and 72 if the size (L and H) of the single wire loop is very large. The size of the single wire loop may be determined such that the magnetic field $\vec{B}_L$ is not so large compared to $\vec{B}_{DC}$ that it is difficult to make an accurate calibration.

Figure 10:
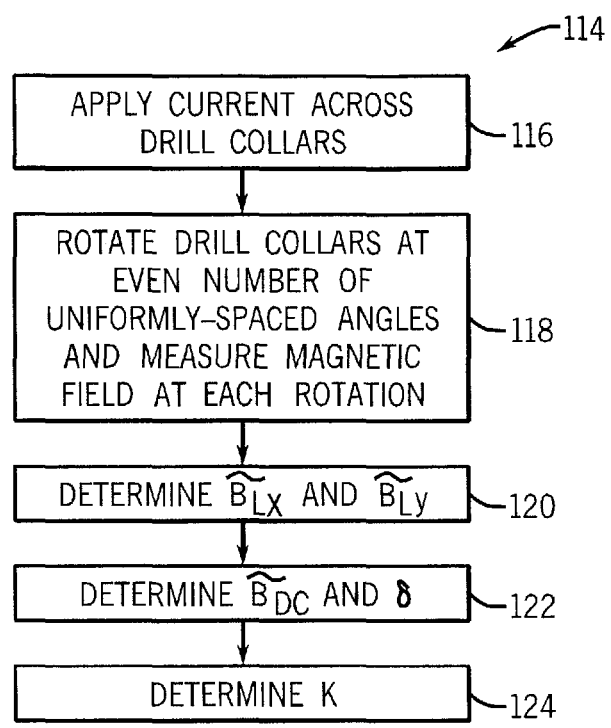
FIG. 10 is a flowchart describing another method for calibrating a measurement sub using the calibration system of FIG. 6, in accordance with an embodiment.

Additional or alternative data acquisition and processing methods are also possible. For example, in FIG. 10, a flowchart 114 describes another manner of calibrating the measurement sub 36 using the calibration system 66. While the measurement sub 36 is in place among the drill collars 68 in the calibration system 66, in step 116, current 28 may be applied across the drill collars 68 using either downhole electronics or a laboratory oscillator. In step 118, the measurement sub 36 may be rotated at an even number of uniformly spaced angles, such as the set of angles $\{\phi_1=0°, \phi_2=40°, \phi_3=80°, \ldots, \phi_9=320°\}$ shown in FIGS. 8A-8J. At each rotation, the magnetic field $\vec{B}(\phi)$ may be measured.

In step 120, the contribution to the magnetic field $\vec{B}(\phi)$ from the two loops 70 and 72 can be obtained from the averages of the measured components of the magnetic field $B_x(\phi)$ and $B_y(\phi)$, according to the following equations:

$$\widetilde{B_{Lx}} = \frac{1}{n}\sum_{i=1}^{n} \widetilde{B}_x(\phi_i), \text{ and} \quad (8a)$$

$$\widetilde{B_{Ly}} = \frac{1}{n}\sum_{i=1}^{n} \widetilde{B}_y(\phi_i). \quad (8b)$$

The magnetic fields $\widetilde{B_{Lx}}$ and $\widetilde{B_{Ly}}$ can be obtained from the averages noted above because the sine and cosine functions average to zero when there is an equal number of equally spaced angles. These two quantities can be subtracted from the measured data such that the following relationships are satisfied:

$$B_{DC}\sin(\delta - \phi_i) = \widetilde{B}_x(\phi_i) - \widetilde{B_{Lx}} \quad (9a), \text{ and}$$

$$B_{DC}\cos(\delta - \phi_i) = \widetilde{B}_y(\phi_i) - \widetilde{B_{Ly}} \quad (9b).$$

In a next step 122, squaring and adding equations (9a) and (9b) give the magnetic field due to eccentricity $\widetilde{B_{DC}}$ as follows:

$$\widetilde{B_{DC}} = \sum_{i=1}^{n} \sqrt{(B_x(\phi_i) - \widetilde{B_{Lx}})^2 + (B_y(\phi_i) - \widetilde{B_{Ly}})^2}. \quad (10)$$

Further, the calibration angle $\delta$ may be obtained by minimizing either of the following equations:

$$\chi_{\delta x}^2 = \sum_{i=1}^{n} \{\tilde{B}_x(\phi_i) - \widetilde{B_{DC}}\sin(\delta - \phi_i) - \widetilde{B_{Lx}}\}^2, \text{ or} \quad (11a)$$

$$\chi_{\delta y}^2 = \sum_{i=1}^{n} \{\tilde{B}_y(\phi_i) - \widetilde{B_{DC}}\cos(\delta - \phi_i) - \widetilde{B_{Ly}}\}^2, \quad (11b)$$

with respect to $\delta$.

In step 124, the calibration constant K may be determined from $K = \widetilde{B_{DC}}/(\tilde{I}_1 + \tilde{I}_2)$, where $\tilde{I}_1$ and $\tilde{I}_2$ are measured using the precision resistors R1 and R2. Note that a minimum of two angles are needed for obtaining K and $\delta$ using the approach outlined in the flowchart 114 of FIG. 10, but more angles may improve the accuracy of this approach.

Figure 11:
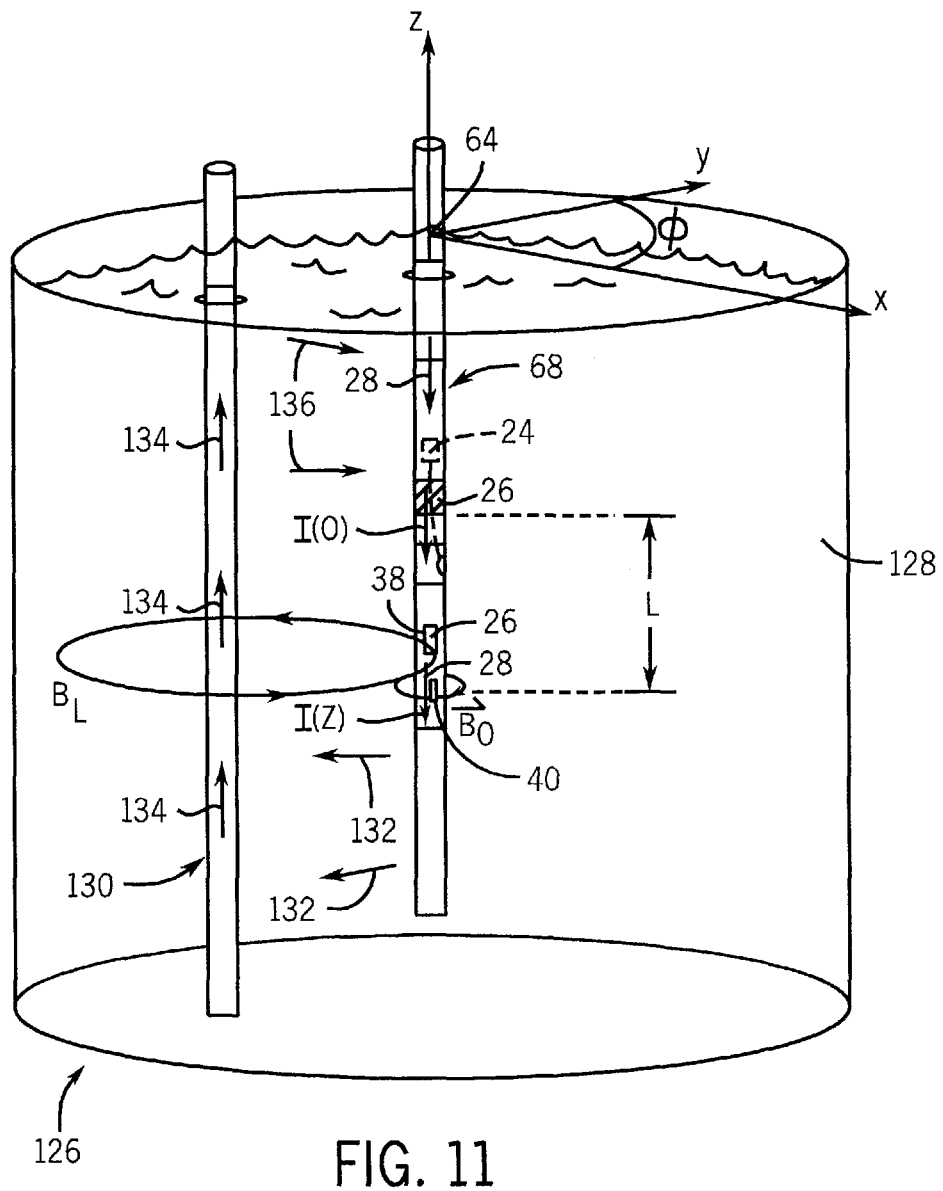
FIG. 11 illustrates another calibration system for calibrating a measurement sub with an eccentric drill collar in accordance with an embodiment.

FIG. 11 illustrates an alternative calibration system 126 for calibrating the measurement sub 36. Like the calibration system 66 of FIG. 6, the calibration system 126 of FIG. 11 may include the drill collars 68 having the electric current driving tool 24 for generating the current 28 across the insulated gap 26, as well as the measurement sub 36, which may include both the internal three-axis magnetometer 38 and the external magnetometer 40. The drill collars 68 may be placed in a water-filled tank 128 with a simulated cased well 130 formed from, for example, casing or a metal pipe. It should be noted, however, that the presence of the simulated cased well 130 is not essential.

Using either downhole or laboratory electronics, the current 28 may be generated across the insulated gap 26 with a known value I(0). A portion of the current 28 may flow out into water in the water-filled tank 128 as an outflow current 132. Some of the outflow current 132 may flow across the simulated cased well 130 as casing current 134. The casing current 134 and the remainder of the outflow current 132 may return to the drill collars 68 as an inflow current 136. The water in the water-filled tank 128 and the simulated cased well 130 provide conductive paths for the current 28 to return to the drill collars 68 above the insulated gap 26.

Figure 12:
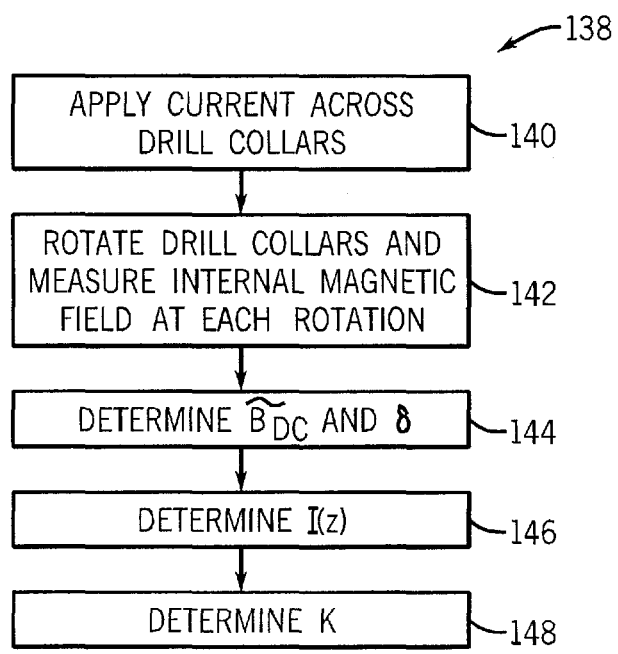
FIG. 12 is a flowchart describing a method for calibrating a measurement sub using the calibration system of FIG. 11, in accordance with an embodiment.

A flowchart 138, illustrated in FIG. 12, describes a manner of calibrating the measurement sub 36 using the calibration system 126 illustrated in FIG. 11. In a first step 140, the current 28 may be applied across the insulated gap 26 using either downhole or laboratory electronics. In a next step 142, the three-axis magnetometer 38 may measure the magnetic field that penetrates the drill collars 68 at several angles $\{\phi_i, i=1, 2, 3, \ldots, n\}$. Referring to FIG. 11, x and y coordinates are transverse to the axis of the drill collars 68 and $\phi$ is the angle between the scribe mark 64 and the x axis. The x and y components of the magnetic field measurable to the internal three-axis magnetometer 38 may be given by Equation (5a), (5b), and (5c). It should be understood that, because the calibration system 126 is used, rather than the calibration system 66, the relationship $\vec{B}_L = B_{Lx}\hat{x} + B_{Ly}\hat{y}$ now applies to the magnetic field $\vec{B}_L$, which may arise due to the simulated cased well 130. Even if the simulated cased well 130 is not present in the water-filled tank 128 of the calibration system 126, a small magnetic field $\vec{B}_L$ may still arise due to asymmetry of the water-filled tank 128. In either case, the magnetic field $\vec{B}_L$ will not change as the angle $\phi$ changes as the drill collars 68 rotate. Based on such measurements, in step 144 of the flowchart 138 of FIG. 12, the magnetic field due to eccentricity $\widetilde{B_{DC}}$ and the calibration angle $\delta$ may be determined using, for example, the techniques described in the flowcharts 74 and 114.

In step 146, the current 28 at the measurement sub 36, I(z), may be determined. Because the primary distinction between the calibration system 126 of FIG. 11 and the calibration system 66 of FIG. 6 is that the current I(z) will vary along the length of the drill collars 68 in the calibration system 126, the current 28 at the insulated gap, I(0), may be provided by the downhole electronics or laboratory electronics as a known quantity. If the external magnetometer 40 is present on the measurement sub 36, the current 28 at the measurement sub 36, I(z), may also be determined using Equation (7) above. If the external magnetometer 40 is not present on the measurement sub 36, the current 28 at the measurement sub 36, I(z), may be calculated using the known geometry of the drill collars 68, the water-filled tank 128, and the location and size of the simulated cased well 130. Such a calculation can be performed using numerical modeling codes. By way of example, an approximate answer may be obtained by assuming that the current 28 on the drill collars 68 decreases linearly above and below the insulated gap 26. For example, if the length of the drill collars 68 below the gap is L, then the current 28 measured at a distance z below the gap may be estimated using the following relationship:

$$I(z) = I(0)\frac{L-z}{L}. \quad (12)$$

Having determined the current I(z) at the measurement sub 36 in step 146, in step 148, the calibration constant K may be determined from the relationship $K = \widetilde{B_{DC}}/I(z)$. A minimum of two angles are needed for obtaining K and $\delta$ using the approach outlined in the flowchart 138 of FIG. 12, but more angles may improve the accuracy of this approach.

Figure 13:
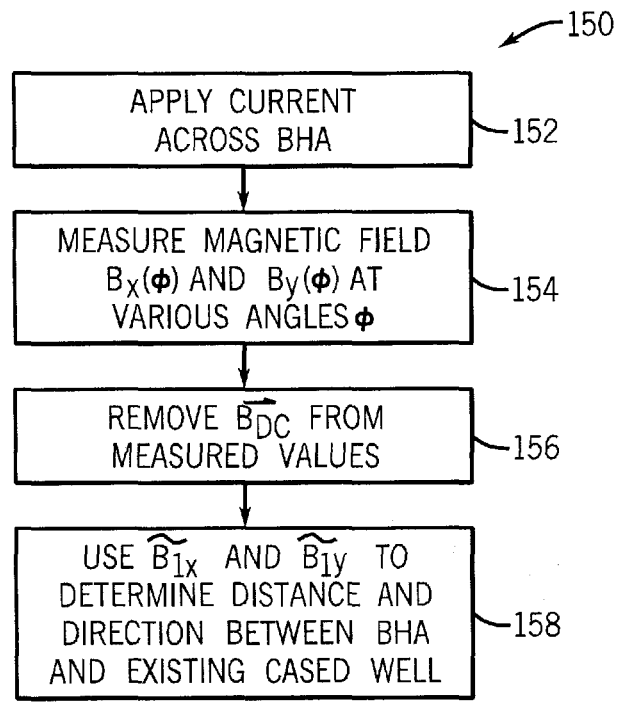
FIG. 13 is a flowchart describing a method for determining the distance and direction to an existing cased well using a calibrated measurement sub, in accordance with an embodiment.

Once obtained, the calibration angle $\delta$ and the calibration constant K may be employed to improve techniques for magnetic ranging while drilling. Specifically, by removing noise caused by asymmetries in the measurement sub 36, the distance and direction from the BHA 18 to the existing cased well 16 may be more precisely determined. Turning to FIG. 13, a flowchart 150 describes a manner of employing the calibration angle $\delta$ and the calibration constant K to reduce noise detected while performing techniques for magnetic ranging while drilling. In a first step 152, a current 32 may be caused to flow on the existing cased well 16. As noted above, the electric current driving tool 24 in the BHA 18 may produce the current 28 across the insulated gap 26, also denoted as the current I(z) in FIG. 1. As the outflow formation currents 30 leave the BHA 18 and travel to the existing cased well 16, producing the smaller current 32, also denoted I'(z'). The current I'(z') produces the magnetic field $\vec{B}_1$, which may be described according to the following relationship:

$$\vec{B}_1 = B_{1x}\hat{x} + B_{1y}\hat{y} + B_{1z}\hat{z} \quad (13).$$

In step 154, the magnetic field $\vec{B}_1$ may be measured by the internal three-axis magnetometer 38 of the measurement sub 36 at various angles of BHA 18 rotation. While the three axes of magnetometer 38 will not coincide with the axes in the geostationary frame (x,y,z), it is a simple matter to transform the three magnetometer axes readings into the geostationary frame. Thus, the magnetic field $\vec{B}_1$ is not a function of the orientation of the measurement sub 36 (e.g., the gravity tool face (GTF) or magnetic tool face (MTF)). In the course of measuring the magnetic field $\vec{B}_1$, the internal three-axis magnetometer 38 may additionally measure the magnetic field $B_{DC}$ due to asymmetries in the measurement sub 36 of the BHA 18. The internal three-axis magnetometer 38 in the measurement sub 36 may detect a total magnetic field described by the following equation:

$$\vec{B}(\phi) = B_x(\phi)\hat{x} + B_y(\phi)\hat{y} + B_z(\phi)\hat{z} \quad (14),$$

where z is aligned with the axis of the BHA 18, and where x and y are transverse to the axis of the BHA 18. Though the two wells depicted in FIG. 1 are vertical wells, for a horizontal SAGD well, x is assumed to be "up". Note that Equation (14) differs from Equation (5a) in that it includes a magnetic field component in the axial, or z, direction. Normally, asymmetries in the drill collars of the BHA 18 produce very small magnetic fields in the axial direction and can be neglected. In addition, when the existing cased well 16 is parallel to the BHA 18, the direction and distance from the BHA 18 to the existing cased well 16 are determined primarily based on the magnetic field components $B_{1x}$ and $B_{1y}$, and $B_{1z}$ is of lesser importance. Hence, the presence of a small, uncorrected $B_{1z}$ term is not problematic. The transverse magnetic field components may be given by the following equations:

$$B_x(\phi) = B_{DC}\sin(\delta - \phi) + B_{1x} \quad (15a), \text{ and}$$

$$B_y(\phi) = B_{DC}\cos(\delta - \phi) + B_{1y} \quad (15b).$$

In the situation where the BHA 18 stops rotating and the measurement sub 36 obtains the three data $\{\widetilde{B}_x(\phi), \widetilde{B}_y(\phi), \widetilde{B}_z(\phi)\}$ at a single angle $\phi$, the angle $\phi$ may be determined by an MWD tool by measuring either the gravity tool face (GTF) or the magnetic tool face (MTF). After the measurements are obtained by the three-axis magnetometer 38, the measurements may be transmitted to the surface 42 for processing via the BHA control/MWD interface 44.

In step 156, the data processing circuitry 48 may remove the magnetic field $B_{DC}$ due the collar asymmetry from the measurements obtained by the three-axis magnetometer 38 using the following equations:

$$\widetilde{B}_{1x} = \widetilde{B}_x(\phi) - B_{DC}\sin(\delta - \phi) = \widetilde{B}_x(\phi) - \tilde{I}K\sin(\delta - \phi) \quad (16a), \text{ and}$$

$$\widetilde{B}_{1y} = \widetilde{B}_y(\phi) - B_{DC}\cos(\delta - \phi) = \widetilde{B}_y(\phi) - \tilde{I}K\cos(\delta - \phi) \quad (16a),$$

where $\tilde{I}$ is the current 28 on the drill collar of the BHA 18 at the measurement sub 36. It should be noted that $\tilde{I}$ may be obtained using the external magnetometer 40 and using equation (7). If the external magnetometer 40 is not available, Equation (12) may be used to estimate $\tilde{I}$. Alternatively, a more precise numerical model may be used to estimate $\tilde{I}$ if the formation 14 resistivity and layering are known. In step 158, once $\widetilde{B}_{1x}$ and $\widetilde{B}_{1y}$ have been obtained by removing the portion of the measured magnetic field signals due to the magnetic field $\vec{B}_{DC}$, the distance and direction between the BHA 18 and the existing cased well 16 may be determined using methods described in the above-referenced patent applications.

Figure 14:
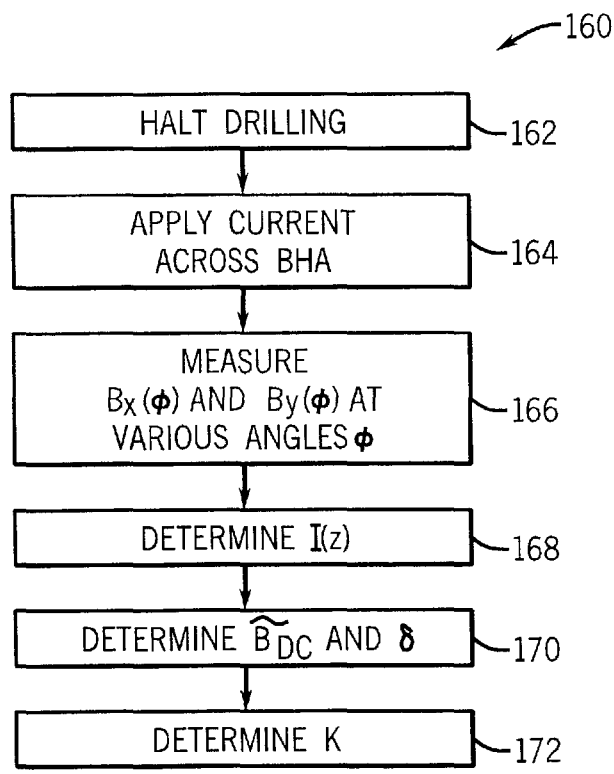
FIG. 14 is a flowchart describing a method for calibrating a measurement sub in situ in an earthen formation when the measurement sub includes an external magnetometer, in accordance with an embodiment.

While the measurement sub 36 may be calibrated using the calibration systems 66 or 126, as described above, the measurement sub 36 may also be calibrated in situ in a borehole when the measurement sub 36 is included in a BHA 18 such as the BHA 18 illustrated in FIG. 1. A flowchart 160, illustrated in FIG. 14, describes a manner of calibrating the measurement sub 36 in situ. Such a situation is similar to the calibration procedures described above with reference to the flowchart 138 of FIG. 12 involving the calibration system 126 of FIG. 11, except that the earth formation 14 serves the same function as the water-filled tank 128. As in the techniques disclosed above, the existing cased well 16 need not be present to calibrate the measurement sub 36.

In a first step 162, the drilling may be halted at one depth. The current 28 may be applied across the BHA 18 in step 164 using the electric current driving tool 24 and, in step 166, the three-axis magnetometer 38 may take several measurements of the resulting magnetic field components $B_x(\phi)$ and $B_y(\phi)$, which represent components of those magnetic fields capable of penetrating the measurement sub 36 and thus measurable to the three-axis magnetometer 38. The measurement sub 36 may thus obtain a data set $\{\widetilde{B}_x(\phi_i), \widetilde{B}_y(\phi_i)\}$, for $\{\phi_1, i=1, 2, 3, \ldots, n\}$. For each data point taken at each angle of rotation, the BHA 18 should be stationary.

In step 168, the external magnetometer 40 may be employed to determine the current 28 at the measurement sub 36 for each angle. In step 170, the magnetic field $\vec{B}_{DC}$ due to the eccentricity of the measurement sub 36 and the calibration angle $\delta$ may be determined. In step 172, the calibration constant K may be determined, for example, using the techniques described above with reference to the flowcharts 74 and 114.

In situ calibration may provide certain advantages, as additional coherent noise may be present in situ that may not otherwise be present in other settings. In particular, elements of the drill bit 20 and the steerable system 22, which may include a mud motor and bent sub consisting of magnetic materials, may contribute a small magnetic signal under some circumstances. Because an in situ calibration calibrates the entire BHA 18, any such additional effects can be removed using the technique described in the flowchart 160 of FIG. 14.

Once K and $\delta$ have been obtained, the corrective techniques described above and relating to Equations (16a) and (16b) may be applied to data obtained by the magnetometer 38 at subsequent depths. Only one angle for such measurements need be obtained at subsequent depths.

Figure 15:
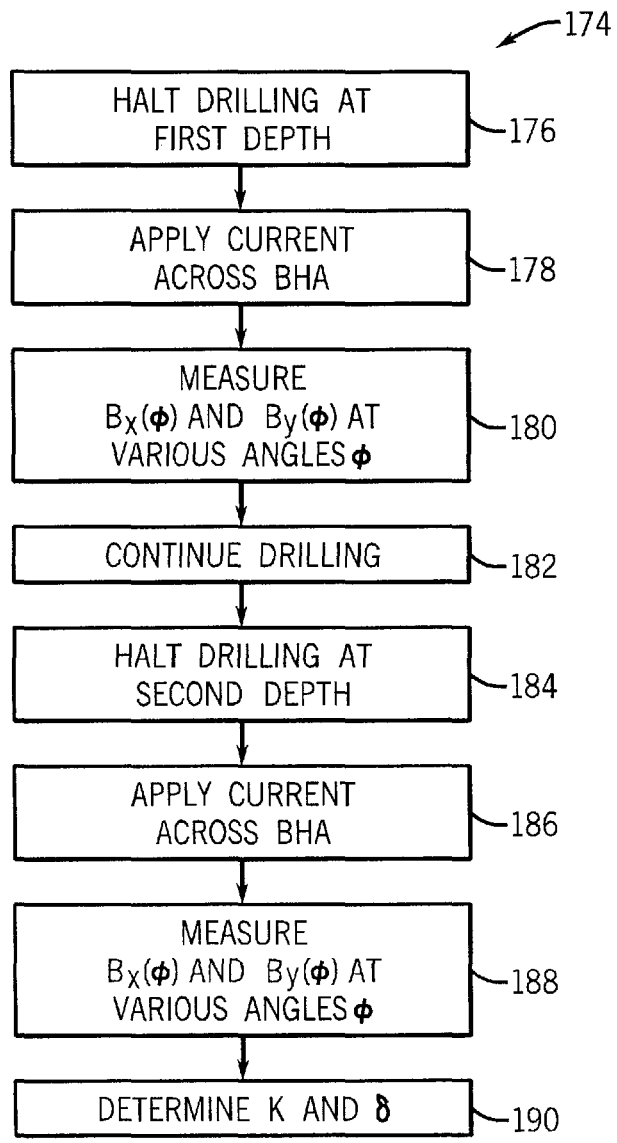
FIG. 15 is a flowchart describing a method for calibrating a measurement sub in situ in an earthen formation when the measurement sub does not include an external magnetometer, in accordance with an embodiment.

If the external magnetometer 40 is not present in the BHA 18, another method of in situ calibration may be employed, as described in a flowchart 174 of FIG. 15. Like the method of the flowchart 160 of FIG. 14, the method of the flowchart 174 of FIG. 15 may involve taking measurements of the magnetic field at a multiple angles. However, the flowchart 174 may additionally involve taking multiple measurements at varying depths to properly determine the current 28 on the BHA 18.

In a first step 176, drilling may be halted at a first depth and, in step 178, the current 28 may be applied across the BHA 18 using the electric current driving tool 24. In step 180, the three-axis magnetometer 38 may take several measurements of the resulting magnetic field components $B_x(\phi)$ and $B_y(\phi)$, which represent components of those magnetic fields capable of penetrating the measurement sub 36 and thus measurable to the three-axis magnetometer 38. The measurement sub 36 may thus obtain a data set $\{\widetilde{B}_x(\phi_i), \widetilde{B}_y(\phi_i)\}$, for $\{\phi_i, i=1, 2, 3, \ldots, n\}$. For each data point taken at each angle of rotation, the BHA 18 should be stationary.

In step 182, drilling may continue until, in step 184, drilling is halted at a second depth. In step 186, the current 28 may be applied across the BHA 18 and subsequently, in step 188, the three-axis magnetometer 38 may take several additional measurements of the resulting magnetic field components $B_x(\phi)$ and $B_y(\phi)$. Because the current distribution on the BHA 18 is not a function of the angle $\phi$, there is no need to measure $\tilde{I}$ at the location of the measurement sub 36. However, the current at the insulated gap 26, I(0), should be measured for each angle to normalize the measured magnetic field, as the current 28 may vary. In step 190, using the normalized sets of data, the calibration constant K and calibration angle δ may be determined in the manners described above.

A disadvantage of this approach is that it requires the driller to stop drilling and to take several measurements at each depth. Additionally, it should be noted that if the resistivity of the formation 14 varies with depth, then $\tilde{I}$ may also vary with depth. Hence, obtaining data at several angles is recommended. If the resistivity of the formation 14 does not vary with depth, then it may be assumed that $\tilde{I}$ is also independent of depth. Since K is constant, the magnetic field $\vec{B}_{DC}$ will also be constant. Once $\vec{B}_{DC}$ and the calibration angle S have been determined from measurements at one depth as described above, they can be used in conjunction with equations (12), (16a), and (16b), and only one measurement may be required at each subsequent depth.

A drawback to the methods described above in flowcharts 160 and 174 is the requirement to stop rotating the BHA, which may involve delaying the drilling process to acquire data. An additional method where by the measurement can be performed while continuously rotating the BHA would be advantageous. As described in Equation (15), the magnetic field $\vec{B}(\phi)$ has two components, one component ($\vec{B}_{DC}$) due to coherent noise, which has a sinusoidal dependence on the tool face ($\phi$), and the other component ($\vec{B}_1$) arising from the current 32 on the casing of the existing cased well 16, which is invariant with respect to the angle $\phi$. Measurements taken over time while the BHA 18 rotates at a given depth may be used to separate the two components.

For an alternating current, which has been implicitly assumed, the time dependence has been suppressed in previous equations. However, now the time dependence of the alternating current will be explicitly expressed in the following equations by $\sin(\omega t)$. In addition, the earth's dc magnetic field, $\vec{A} = A_x \hat{x} + A_y \hat{y} + A_z \hat{z}$, will be included. Specifically, Equation (15) may be revised to explicitly include time t and the earth's magnetic field as follows:

$$B_x(t) = B_{DC}\sin(\omega t)\sin(\delta-\phi) + B_{1x}\sin(\omega t) + A_x$$

$$B_y(t) = B_{DC}\sin(\omega t)\cos(\delta-\phi) + B_{1y}\sin(\omega t) + A_y \quad (17).$$

These equations refer to the magnetic field in the geostationary (x,y,z) coordinate system indicated in FIG. 4, where the z direction is along the BHA 18 axis. In the case of essentially horizontal wells, the x direction may be up and the angle $\phi$ may be between the scribe mark and up as was illustrated in FIG. 8.

The three-axis magnetometer 38 is related to a $(\bar{x},\bar{y},z)$ coordinate system attached to the BHA 18 where the $\bar{x}$ axis is aligned with the scribe mark and the z axis is aligned with the BHA axis. The relationship between the geostationary coordinate system and the one associated with the BHA is $$\begin{bmatrix} \bar{x} \\ \bar{y} \end{bmatrix} = \begin{bmatrix} \cos\phi & \sin\phi \\ -\sin\phi & \cos\phi \end{bmatrix} \begin{bmatrix} x \\ y \end{bmatrix}. \quad (18)$$

Similarly, the transverse magnetic field components, $B_{\bar{x}}(t)$ and $B_{\bar{y}}(t)$ measured by the three-axis magnetometer in the BHA frame is related to the magnetic field in the geostationary frame by $$\begin{bmatrix} B_{\bar{x}}(t) \\ B_{\bar{y}}(t) \end{bmatrix} = \begin{bmatrix} \cos\phi & \sin\phi \\ -\sin\phi & \cos\phi \end{bmatrix} \begin{bmatrix} B_x(t) \\ B_y(t) \end{bmatrix}. \quad (19)$$

If the BHA is rotating at a constant angular frequency $\omega_0$, then $\phi = \omega_0 t$. Inserting equation (17) into equation (19) yields $$B_{\bar{x}}(t) = \quad (20)$$
$$A_x\cos(\omega_0 t) + A_y\sin(\omega_0 t) + B_{DC}\sin\delta\sin(\omega t) + 0.5B_{1x}\sin(\omega - \omega_0)t +$$
$$0.5B_{1y}\cos(\omega - \omega_0)t + 0.5B_{1x}\sin(\omega + \omega_0)t - 0.5B_{1y}\cos(\omega + \omega_0)t$$

and $$B_{\bar{y}}(t) = \quad (21)$$
$$-A_x\sin(\omega_0 t) + A_y\cos(\omega_0 t) + B_{DC}\cos\delta\sin(\omega t) - 0.5B_{1x}\cos(\omega - \omega_0)t +$$
$$0.5B_{1y}\sin(\omega - \omega_0)t + 0.5B_{1x}\cos(\omega + \omega_0)t + 0.5B_{1y}\sin(\omega + \omega_0)t.$$

Equations (20) and (21) express the transverse magnetic field components as measured by the three-axis magnetometer which is rotating at the angular frequency $\omega_0$. Thus, the earth's magnetic field (A) is modulated at frequency $\omega_0$, the magnetic field due to asymmetry ($\vec{B}_{DC}$) is modulated at frequency $\omega$, and the magnetic field ($\vec{B}_1$) due to a casing is modulated at frequencies ($\omega-\omega_0$) and ($\omega+\omega_0$). For example, if the BHA 18 is rotating at 60 RPM (i.e. 1 Hz), then $\omega_0 = 2\pi S^{-1}$. If the AC current frequency is f=10 Hz, then $\omega = 2\pi 10 = 20\pi S^{-1}$. The side bands are $(\omega-\omega_0) = 18\pi S^{-1}$ and $(\omega+\omega_0) = 22\pi S^{-1}$.

Figure 16:
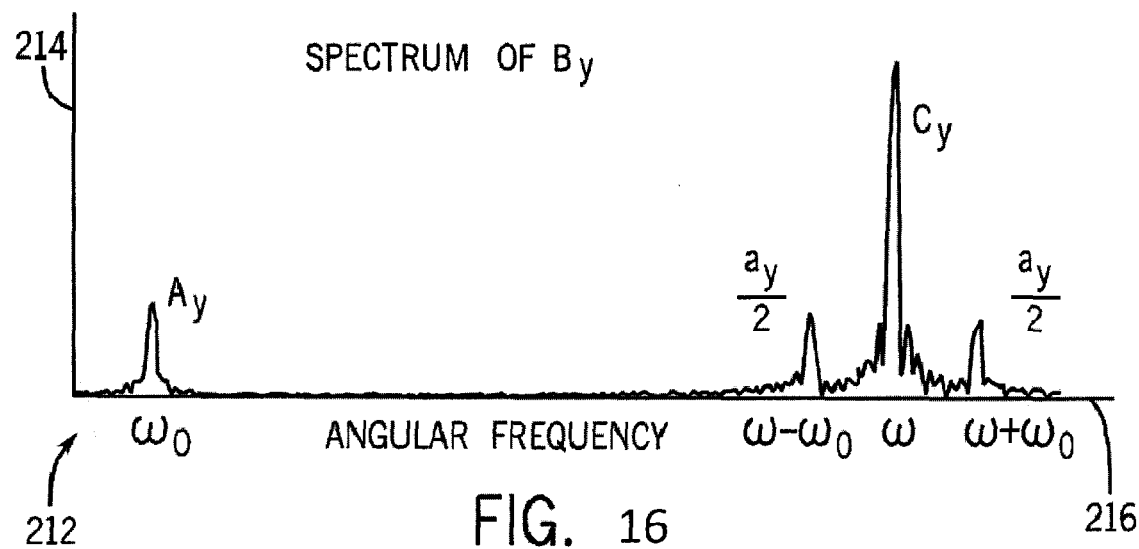
FIG. 16 is a spectral plot of the simulated magnetic field measurements.

FIG. 16 illustrates a plot 212 containing a spectrum of the measured magnetic field component $B_{\bar{y}}$; there is a similar plot for $B_{\bar{x}}$. In the plot 212 of FIG. 16, an ordinate 214 represents the magnitude of the measured magnetic field $B_{\bar{y}}$ and an abscissa 216 represents angular frequency. The coherent noise $\vec{B}_{DC}$ is observed at the angular frequency $\omega$, while the signals due to the casing $\vec{B}_1$ occur at the sidebands at $(\omega-\omega_0)$ $S^{-1}$ and $(\omega+\omega_0)$. The earth's magnetic field (A) is approximately 50,000 nanoTesla, whereas magnetic field $\vec{B}_1$ may be much smaller at approximately 10 to 100 nanoTesla. However, the earth's magnetic field can be highly attenuated by a bandpass filter on the magnetometer output since $\omega_0$ is significantly below $(\omega-\omega_0)$. The spectrum shown in FIG. 16 has been suitably high-pass filtered to reduce the earth's magnetic field to a manageable size.

Figure 17:
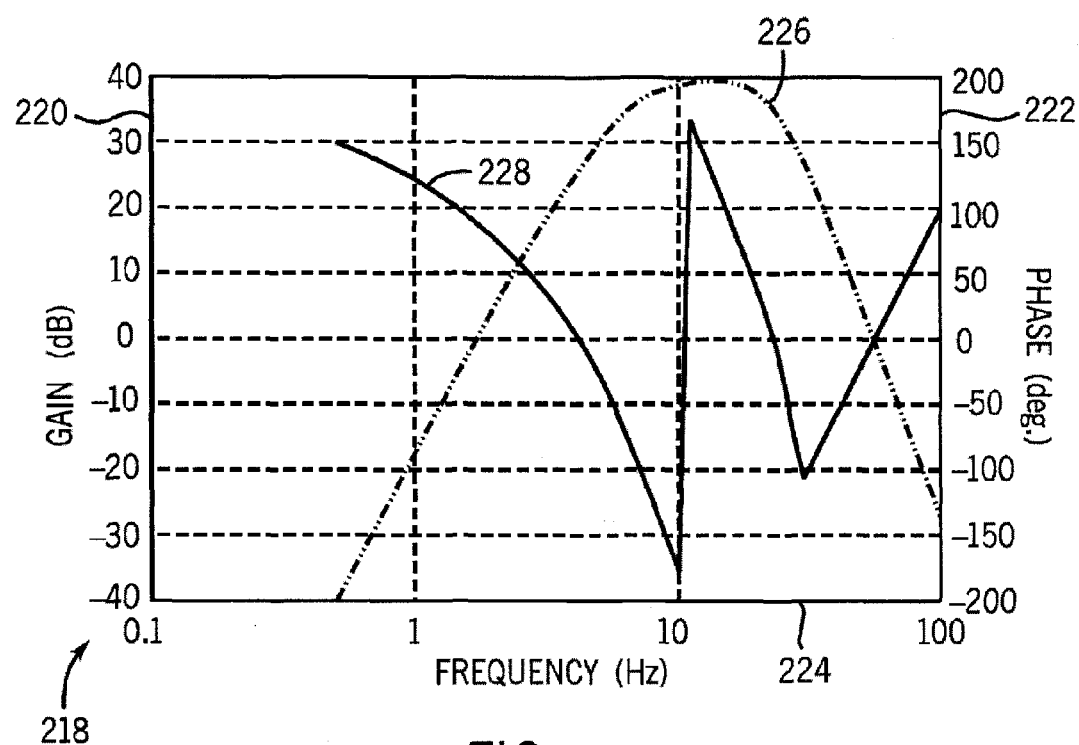
FIG. 17 is a plot of the gain and phase of the simulated magnetic field measurements against frequency.

FIG. 17 is a plot 218 illustrating a typical frequency characteristic of a filter on the output of a magnetometer. A first ordinate 220 represents the gain of the filter in units of decibels; a second ordinate 222 represents the phase in units of degrees, and an abscissa 224 represents frequency in units of Hertz on a logarithmic scale. As illustrated by a gain curve 226, low frequencies, such as the earth's magnetic field A, may be substantially attenuated. A phase curve 228 illustrates the changes in phase of the received signals as frequency increases. It should be noted that, while the earth's magnetic field may be fairly small, as shown in FIG. 16, measurements of $A_x$ and $A_y$ can be used to determine the magnetic tool face (MTF) when combined with data from a three-axis accelerometer in the BHA 18.

Figure 18:
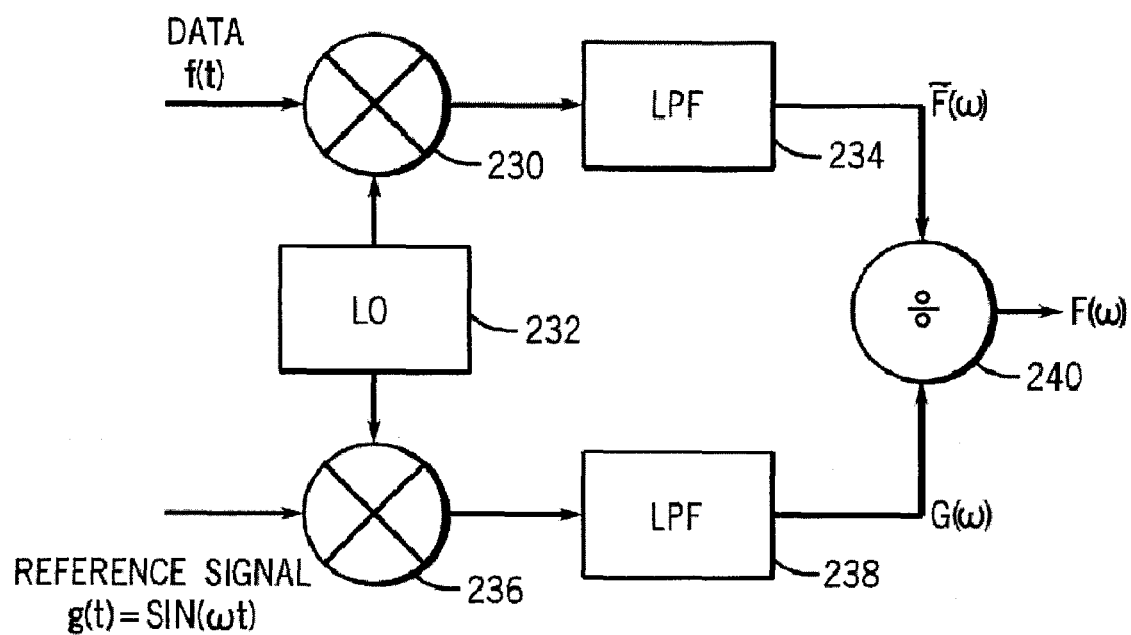
FIG. 18 is a flow diagram representing a manner of processing simulated magnetic field measurements, in accordance with an embodiment.

FIG. 18 illustrates a flow diagram for processing magnetic field signals obtained by the three-axis magnetometer 38 while the BHA 18 is rotating. As illustrated in FIG. 18, data may be multiplied 230 with a signal from a local oscillator 232, before entering a low pass filter 234. Meanwhile, a sinusoidal reference signal may be multiplied 236 with the signal from the local oscillator 232, before entering a low pass filter 238. The filtered data signal may be divided 240 by the filtered reference signal to produce a spectrum signal that may enable identification of the portion of the measured signals derived from the magnetic field $\vec{B}_1$ from the current 32 on the existing cased well 16. The algorithm provided by the flow diagram of FIG. 18 may thus first compute a partial spectrum, from which a peak-detection algorithm may subsequently identify the desired amplitudes and frequencies of the magnetic field $\vec{B}_1$. Such algorithms may be implemented in hardware at the surface 42, or the magnetic field signals may be digitized to be processed by the data processing circuitry 48 in a similar fashion.

Figure 19A:
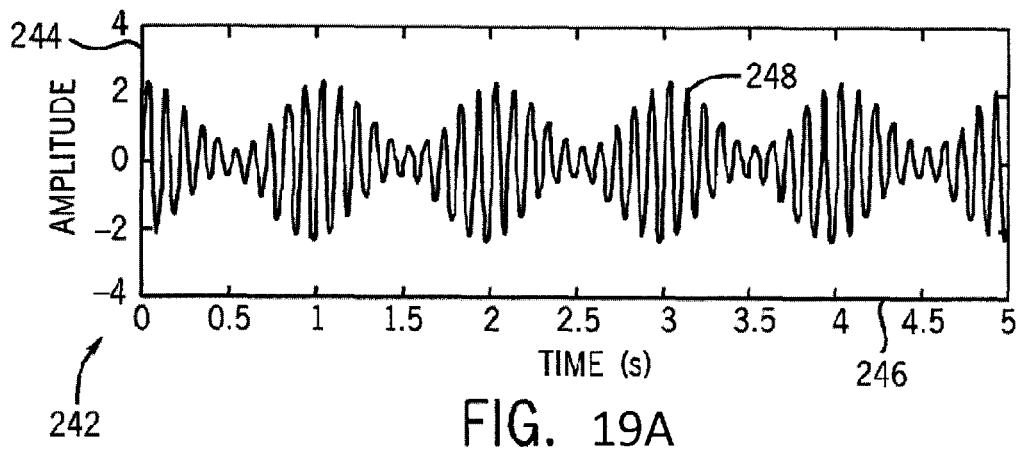
FIGS. 19A-B are plots of simulated magnetic field measurements when the measurement sub is rotating at 60 RPM, in accordance with an embodiment.
Figure 19B:
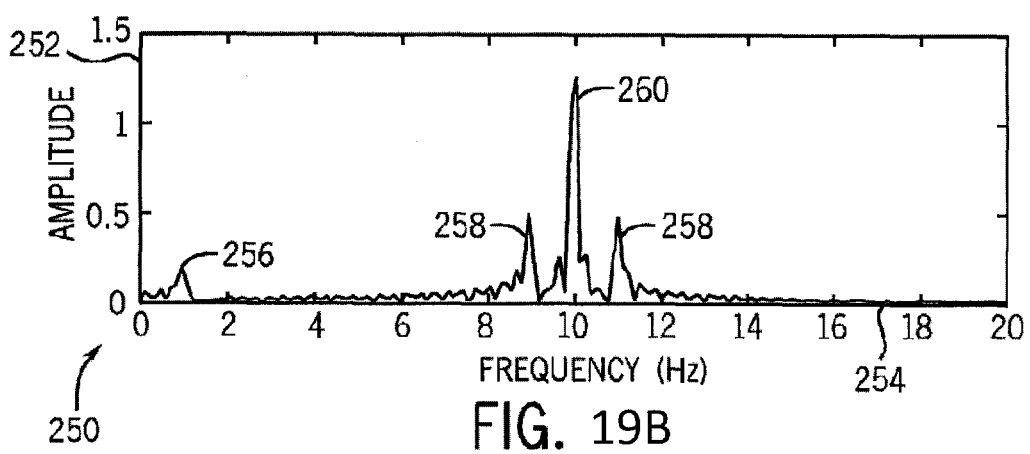

FIGS. 19-21 represent simulated plots of data that may be obtained and/or processed to eliminate coherent noise in magnetic field signals detected by the three-axis magnetometer 38 during magnetic ranging while drilling. The simulated data of FIGS. 19-21 are generated for 5 seconds at a sampling rate of 8031.37 Hz, and the magnetic field $\vec{B}_1$ arising from the current 32 on the existing cased well 16 occurs at 10 Hz. In FIGS. 19A-B, the rotation of the BHA 18 is simulated to be 60 RPM, while in FIGS. 20-21, the rotation of the BHA 18 is simulated to be 30 RPM.

Turning first to FIG. 19A, a plot 242 illustrates a simulated magnetic field $B_{\bar{y}}$ for a simulated BHA 18 rotation of 60 RPM. An ordinate 244 represents the amplitude in units of nanoTesla, and an abscissa 246 represents time in units of seconds. A curve 248 represents a simulated magnetic field $B_{\bar{y}}$. The spectrum is illustrated in a plot 250, as shown in FIG. 19B. An ordinate 252 represents the amplitude in units of nanoTesla, and an abscissa 254 represents frequency in units of Hertz. Features apparent in the spectral plot 250 include a peak 256 representing the earth's magnetic field, two peaks 258 representing the primary signal attributable to the magnetic field $\vec{B}_1$, and a peak 260 attributable to the coherent magnetic field $\vec{B}_{DC}$ due to asymmetries in the drill collar in BHA 18.

Figure 20A:
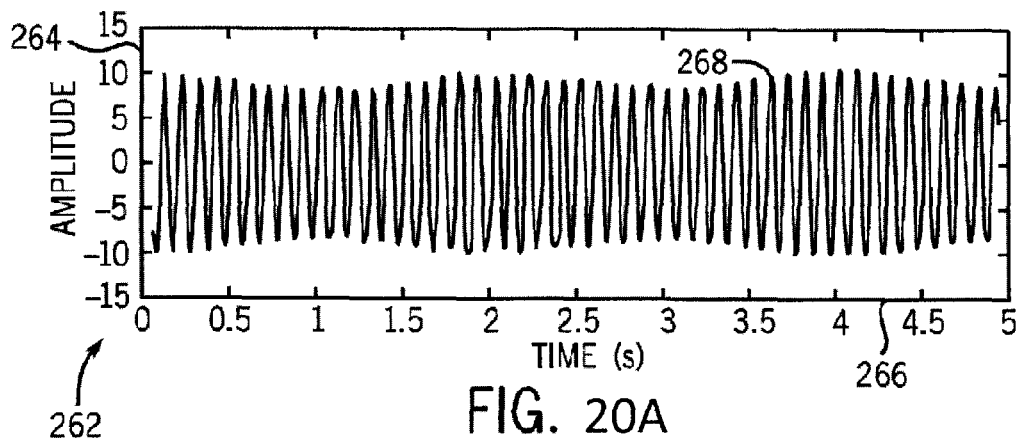
FIGS. 20A-B are plots of simulated magnetic field measurements when the measurement sub is rotating at 30 RPM, in accordance with an embodiment.
Figure 20B:
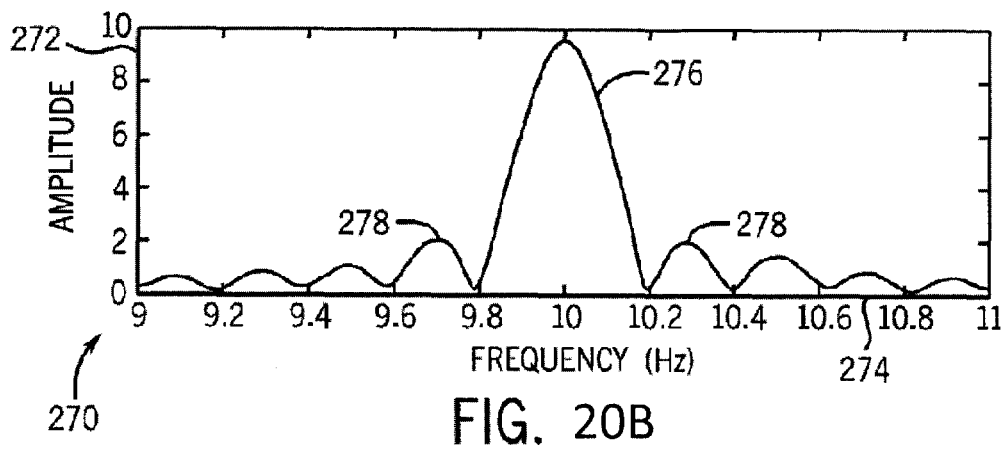

FIG. 20A is a plot 262 illustrating a simulated magnetic field $B_{\bar{y}}$ for a simulated BHA 18 rotation of 30 RPM (i.e. at 0.5 Hz). An ordinate 264 represents the amplitude in units of nanoTesla, and an abscissa 266 represents time in units of seconds. A curve 268 represents a simulated magnetic field $B_{\bar{y}}$. The spectrum from 9 to 11 Hz is illustrated in plot 270, as shown in FIG. 20B. An ordinate 272 represents the amplitude in units of nanoTesla, and an abscissa 274 represents frequency in units of Hertz. Features apparent in the spectrum 270 include a peak 276 due to the magnetic field $\vec{B}_{DC}$ at 10 Hz, side lobes 278 of $\vec{B}_{DC}$ produced by the bandpass filter, and the desired magnetic field $\vec{B}_1$, which should appear as peaks at 9.5 and 10.5 Hz. The coherent noise (i.e. $\vec{B}_{DC}$) in spectrum 270 is approximately ten times greater than the desired signal (i.e. $\vec{B}_1$), and mask the expected peaks that should appear at 9.5 and 10.5 Hz.

Figure 21A:
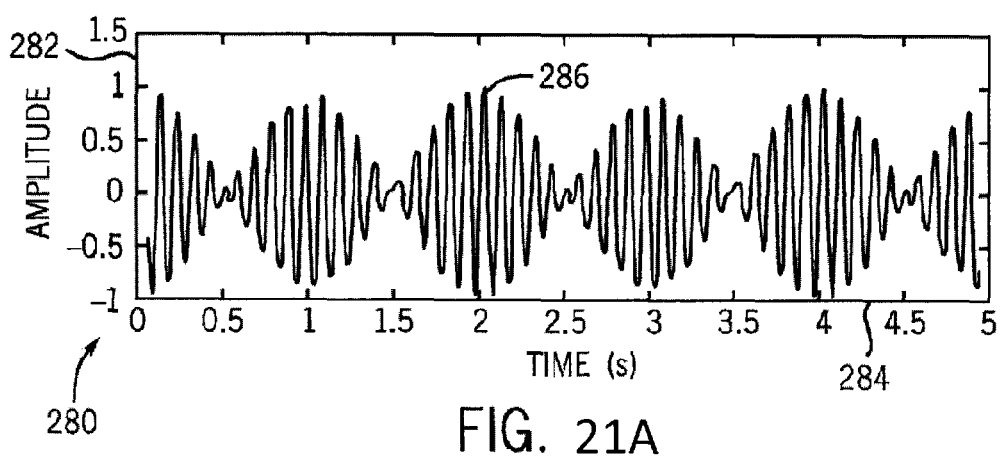
FIGS. 21A-B are plots of the simulated magnetic field measurements of FIGS. 20A-B when coherent magnetic signals have been removed, in accordance with an embodiment.
Figure 21B:
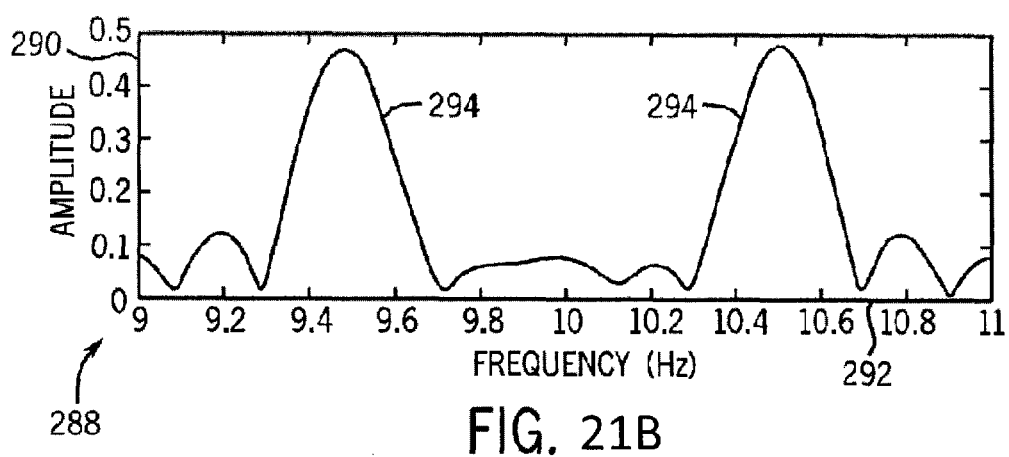

To recover the desired signal $\vec{B}_1$ from FIGS. 20A-B, the coherent component may be filtered away. FIG. 21A is a plot 280 illustrating the simulated magnetic field $B_{\bar{y}}$ 268 that has been processed to eliminate the coherent element of peak 276. An ordinate 282 represents the amplitude in units of nanoTesla, and an abscissa 284 represents time in units of seconds. A curve 286 represents simulated magnetic field $B_{\bar{y}}$ that has been processed to remove the coherent component located at approximately 10 Hz. Suitable filtering algorithms may be found in the book, "Fundamentals of Wavelets", by J. C. Goswami and A. K. Chan, published by John Wiley & Sons, Inc. Refer to section 7.8 "Two Channel Perfect Reconstruction Filter Bank". The spectral view of the signal is illustrated in a plot 288, as shown in FIG. 21B. An ordinate 290 represents the amplitude in units of nanoTesla, and an abscissa 292 represents frequency in units of Hertz. With the coherent noise removed, features apparent in the spectral plot 288 include two peaks 294 representing the primary signal attributable to the magnetic field $\vec{B}_1$.

Figure 22:
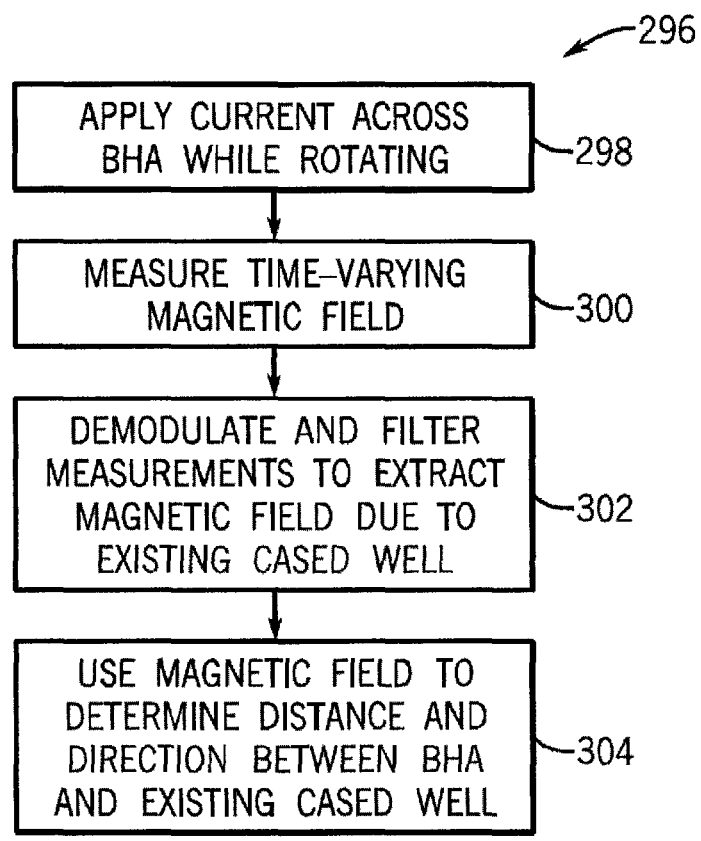
FIG. 22 is flowchart describing a method for calibrating a measurement sub in situ in an earthen formation while the measurement sub is rotating, in accordance with an embodiment.

FIG. 22 is a flow chart 296 describing a manner of performing continuous calibration of the measurement sub 36 while the BHA 18 is rotating. In a first step 298, the electric current driving tool 24 may supply a current 28 across the BHA 18 and, in step 300, the time-varying magnetic field components $B_x(t,\omega_0)$ and $B_y(t,\omega_0)$ may be measured using the three-axis magnetometer 38. The measurements may be transmitted to the surface 42, where dedicated hardware and/or the data processing circuitry 48, in step 302, may demodulate and filter the measurements to extract the components of the magnetic field due to the current 32 on the existing cased well 16, $\vec{B}_1$, in the manner described above. In step 304, the data processing circuitry 48 may employ the determination of the magnetic field $\vec{B}_1$ to ascertain the distance and direction between the BHA 18 and the existing cased well 16.

An alternative method may be used to remove the magnetic field $\vec{B}_{DC}$ from the data acquired while the BHA is rotating. Referring to FIG. 23, the drill collar bore 59 is eccentered in the x' direction, producing a magnetic field $\vec{B}_{DC}$ in the y' direction as was previously described for FIGS. 4 and 5. The scribe mark 64 indicates the $\bar{x}$ axis; the $\bar{x}$ and $\bar{y}$ axes corresponding to the two transverse sensors of the magnetometer 38. The angle between the x' axis and the $\bar{x}$ is δ. The geostationary earth frame is denoted by the x and y axes, and the angle between the x and $\bar{x}$ axes is φ. Noting that there is no component of the magnetic field $\vec{B}_{DC}$ in the x' direction, the measured magnetic field components, $B_{\bar{x}}(t)$ and $B_{\bar{y}}(t)$, can be transformed by a rotation matrix such that one of the rotated components lies along the x' axis.

Specifically, the two measured magnetic field components are rotated by the angle −δ such that $$\begin{bmatrix} B'_x(t) \\ B'_y(t) \end{bmatrix} = \begin{bmatrix} \cos\delta & -\sin\delta \\ \sin\delta & \cos\delta \end{bmatrix} \begin{bmatrix} B_{\bar{x}}(t) \\ B_{\bar{y}}(t) \end{bmatrix}. \tag{22}$$

Substituting equations 20 and 21 into equation 22 produces the results that $$B_{x'}(t) = A_x \cos(\omega_0 t - \delta) + A_y \sin(\omega_0 t - \delta) + B_{DC}\sin(\omega t) + \tag{23}$$
$$0.5 B_{1x}\sin[(\omega - \omega_0)t + \delta] + 0.5 B_{1y}\cos[(\omega - \omega_0)t + \delta] +$$
$$0.5 B_{1x}\sin[(\omega + \omega_0)t - \delta] - 0.5 B_{1y}\cos[(\omega + \omega_0)t - \delta].$$

There is no appearance of $\vec{B}_{DC}$ in equation 23. Hence, by rotating the measured field components $B_x(t)$ and $B_y(t)$ by the angle (−δ), the coherent noise can be eliminated from the rotated component $B_{x'}(t)$. The side bands at $\omega - \omega_0$ and $\omega + \omega_0$ can then be measured accurately since the signal at ω has been suppressed. The angle δ can be determined by the previously described calibration methods and the rotation applied by the processing circuitry 48. Alternatively, different values for δ can be tried until the a minimum at ω appears in the frequency spectrum. Note that there is no need to measure the current $\tilde{I}$ at the location of the magnetometer 38.

The other rotated magnetic field component is $$B_{y'}(t) = -A_x \sin(\omega_0 t - \delta) + A_y \cos(\omega_0 t - \delta) + B_{DC} \sin(\omega t) - \qquad (24)$$
$$0.5 B_{1x} \cos[(\omega - \omega_0)t + \delta] + 0.5 B_{1y} \sin[(\omega - \omega_0)t + \delta] -$$
$$0.5 B_{1x} \cos[(\omega + \omega_0)t - \delta] + 0.5 B_{1y} \sin[(\omega + \omega_0)t - \delta].$$

As anticipated, the coherent noise $\vec{B}_{DC}$ at the frequency ω appears in full force in equation 24.

If the BHA is not rotating, i.e. $\omega_0 t \rightarrow \phi$ where φ is gravity tool face, then equations 23 and 24 can be rewritten as $$B_{x'}(t) = A_x \cos(\phi-\delta) + A_y \sin(\phi-\delta) + +[B_{1x} \cos(\phi-\delta) + B_{1y} \sin(\phi-\delta)] \sin(\omega t), \qquad (25)$$

and $$B_{y'}(t) = -A_x \sin(\phi-\delta) + A_y \cos(\phi-\delta) + B_{DC} \sin(\omega t) + [-B_{1x} \sin(\phi-\delta) + B_{1y} \cos(\phi-\delta)] \sin(\omega t). \qquad (26)$$

Applying a high pass filter to equations 25 and 26, and demodulating yields $$\tilde{B}_{x'}(\phi) = B_{1x} \cos(\phi-\delta) + B_{1y} \sin(\phi-\delta), \qquad (27)$$

and $$\tilde{B}_{y'}(\phi) = B_{DC} - B_{1x} \sin(\phi-\delta) + B_{1y} \cos(\phi-\delta). \qquad (28)$$

Using equation 27, measurements at two or more known angles of φ can be used to determine $B_{1x}$ and $B_{1y}$. Furthermore, $\tilde{B}_{x'}(\phi)$ goes through zero when the x' axis points directly at, or directly away from, cased well 16. This can be used to determine the direction to the cased well 16, while the maximum value for $\tilde{B}_{x'}(\phi)$ is the magnitude of $\vec{B}_1$ and can be used to determine the distance to the cased well 16.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method comprising:
   applying a current across a drill collar that surrounds an internal magnetometer, wherein the current travels across the drill collar and along one or more other current paths to return to the drill collar;
   measuring magnetic fields due to the current across the drill collar and the current across the one or more other current paths using the internal magnetometer, while the drill collar is disposed at a first angle of rotation;
   rotating the drill collar to a second angle of rotation;
   measuring the magnetic fields using the internal magnetometer while the drill collar is disposed at the second angle of rotation; and
   determining a relationship between the current across the drill collar and a portion of the magnetic fields due to the current across the drill collar measurable by the internal magnetometer, wherein determining the relationship comprises determining a calibration angle relating a scribe line of the drill collar and a vector direction of the measurable portion of the magnetic field.

2. The method of claim 1, comprising connecting the drill collar to the one or more other current paths, wherein two wires oppositely disposed around the drill collar comprise the one or more other current paths, and wherein resistive elements coupled to the two wires are configured such that an approximately equal quantity of current flows across each of the two conductive paths.

3. The method of claim 1, wherein portions measurable to the internal magnetometer of the magnetic fields due to the current across the one or more other current paths are approximately equal and opposite.

4. The method of claim 1, comprising connecting the drill collar to the one or more other current paths, wherein a conductive liquid medium comprises the one or more other current paths.

5. The method of claim 1, comprising first drilling into a formation using a borehole assembly that includes the drill collar, wherein the formation comprises the one or more other current paths.

6. A method comprising:
   applying a current across a drill collar that surrounds an internal magnetometer, wherein the current travels across the drill collar and along one or more other current paths to return to the drill collar; measuring magnetic fields due to the current across the drill collar and the current across the one or more other current paths using the internal magnetometer, while the drill collar is disposed at a first angle of rotation;
   rotating the drill collar to a second angle of rotation;
   measuring the magnetic fields using the internal magnetometer while the drill collar is disposed at the second angle of rotation; and
   determining a relationship between the current across the drill collar and a portion of the magnetic fields due to the current across the drill collar measurable by the internal magnetometer, wherein the relationship comprises determining a calibration constant relating a magnitude of the current across the drill collar and a magnitude of the measurable portion of the magnetic field.

7. The method of claim 6, comprising connecting the drill collar to the one or more other current paths, wherein two wires oppositely disposed around the drill collar comprise the one or more other current paths, and wherein resistive elements coupled to the two wires are configured such that an approximately equal quantity of current flows across each of the two conductive paths.

8. The method of claim 6, wherein portions measurable to the internal magnetometer of the magnetic fields due to the current across the one or more other current paths are approximately equal and opposite.

9. The method of claim 6, comprising connecting the drill collar to the one or more other current paths, wherein a conductive liquid medium comprises the one or more other current paths.

10. The method of claim 6, comprising first drilling into a formation using a borehole assembly that includes the drill collar, wherein the formation comprises the one or more other current paths.

* * * * *